United States Patent
Lyakhovych et al.

(10) Patent No.: US 10,131,742 B2
(45) Date of Patent: Nov. 20, 2018

(54) MELT REACTION PROCESS FOR CROSSLINKABLE POLYCARBONATES

(71) Applicant: SABIC GLOBAL TECHNOLOGIES B.V., Bergen op Zoom (NL)

(72) Inventors: Mykhaylo Lyakhovych, La Aljorra (ES); Ignacio Vic Fernandez, La Aljorra (ES); James Franklin Hoover, Mount Vernon, IN (US); Amanda Marie Flores, Mount Vernon, IN (US); Jaykisor Pal, Karnataka (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/320,151

(22) PCT Filed: Jun. 19, 2015

(86) PCT No.: PCT/IB2015/054648
§ 371 (c)(1),
(2) Date: Dec. 19, 2016

(87) PCT Pub. No.: WO2015/193864
PCT Pub. Date: Dec. 23, 2015

(65) Prior Publication Data
US 2017/0129997 A1 May 11, 2017

Related U.S. Application Data

(60) Provisional application No. 62/051,449, filed on Sep. 17, 2014.

(30) Foreign Application Priority Data

Jun. 20, 2014 (EP) .................................. 14382241

(51) Int. Cl.
| | | |
|---|---|---|
| C08F 2/50 | (2006.01) |
| C08G 61/04 | (2006.01) |
| C08G 64/30 | (2006.01) |
| C08G 64/14 | (2006.01) |
| C08J 3/24 | (2006.01) |
| C08J 3/28 | (2006.01) |
| C08G 64/04 | (2006.01) |

(52) U.S. Cl.
CPC .......... *C08G 64/307* (2013.01); *C08G 64/14* (2013.01); *C08J 3/24* (2013.01); *C08J 3/28* (2013.01); *C08G 64/04* (2013.01); *C08J 2369/00* (2013.01)

(58) Field of Classification Search
CPC .......... C08G 64/307; C08G 64/14; C08J 3/28; C08J 3/24; C08J 2369/00
USPC ....................................... 522/111, 1; 520/1
See application file for complete search history.

(56) References Cited

U.S. PATENT DOCUMENTS

| | | | |
|---|---|---|---|
| 4,221,645 A | 9/1980 | Siegfried et al. | |
| 5,455,324 A | 10/1995 | Nukui et al. | |
| 2004/0087756 A1* | 5/2004 | Ramesh | C08G 64/307 528/204 |
| 2005/0192424 A1 | 9/2005 | Shafer et al. | |
| 2014/0179817 A1* | 6/2014 | Morizur | C08G 64/045 521/180 |
| 2017/0129996 A1* | 5/2017 | Flores | C08G 64/10 |
| 2017/0130011 A1* | 5/2017 | Johnson | C08J 3/28 |

FOREIGN PATENT DOCUMENTS

| | | | |
|---|---|---|---|
| CN | 1551896 A | 12/2004 | |
| CN | 1926170 A | 3/2007 | |
| EP | 0584801 | 3/1994 | |
| EP | 0584801 A2 * | 3/1994 | C08G 64/307 |

OTHER PUBLICATIONS

Nukui et al, EP 0584801 Machine Translation, Mar. 2, 1994 (Year: 1994).*
International Search Report for PCT/IB2015/054648 dated Oct. 2, 2015.

* cited by examiner

*Primary Examiner* — Jessica Whiteley
(74) *Attorney, Agent, or Firm* — Cantor Colburn LLP

(57) ABSTRACT

Melt polymerization processes for producing photoactive additives are disclosed. The photoactive additives are cross-linkable polycarbonate resins formed from a benzophenone, a dihydroxy chain extender, a carbonate precursor, and a catalyst. The additives can be produced without the use of phosgene or dichloromethane, and can be cross-linked with other polymers upon exposure to UV radiation.

24 Claims, 5 Drawing Sheets

MELT REACTION PROCESS FOR CROSSLINKABLE POLYCARBONATES

CROSS REFERENCE TO RELATED APPLICATIONS

This application is a 371 of PCT Application Serial No. PCT/IB2015/054648, filed Jun. 19, 2015, which claims priority to EP Application No. 14382241.9, filed on Jun. 20, 2014, and to U.S. Provisional Patent Application Ser. No. 62/051,449, filed on Sep. 17, 2014, which are fully incorporated by reference herein.

BACKGROUND

The present disclosure relates to melt reaction processes for producing cross-linkable polycarbonate resins that can be crosslinked with other polymers, such as polycarbonate polymers, to obtain improved properties.

Polycarbonates (PC) are thermoplastic resins with desirable properties such as high impact strength and toughness. However, such polymers drip when exposed to a flame, and this behavior worsens as the wall thickness decreases. This reduces their utility in transparent and opaque thin-wall applications where a V0 or 5 VA flame retardance rating is required.

Furthermore, one current method of producing these polymers is the interfacial reaction using phosgene and the solvent dichloromethane, which have undesirable environmental, health, and safety implications. It would be desirable to produce additives that can improve the properties of polycarbonates through a process that does not involve phosgene and dichloromethane.

BRIEF DESCRIPTION

The present disclosure relates to melt reaction processes for producing compounds, oligomers, or polymers which can be used to crosslink resins (e.g., polycarbonates) and improve their flame resistance and chemical resistance. In particular, the additives are cross-linkable polycarbonate resins formed by the reaction of a benzophenone with a dihydroxy chain extender in the presence of a transesterification catalyst at elevated temperatures. Generally, carbonate or ester linkages are found in the additives.

Disclosed herein are processes for making a cross-linkable polycarbonate resin, comprising: combining a first dihydroxy chain extender, a diaryl carbonate, and a transesterification catalyst to form a polycarbonate reaction mixture; melt polymerizing the polycarbonate reaction mixture with a hydroxybenzophenone to form the cross-linkable polycarbonate resin; and isolating the cross-linkable polycarbonate resin. The polycarbonate resin can be used in blends to make articles, and cross-linked.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
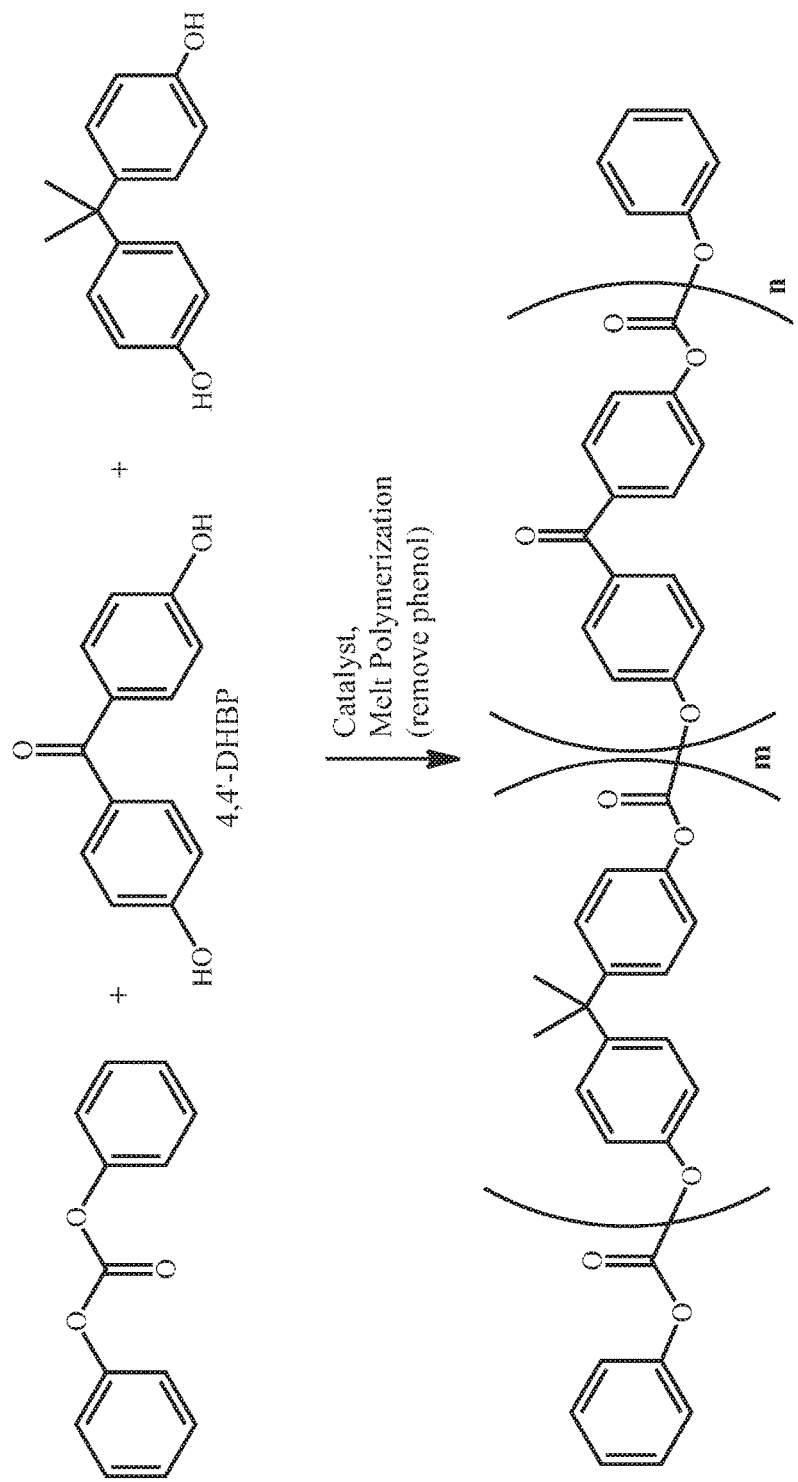
FIG. 1 illustrates the formation of a photoactive additive (oligomer/polymer) from a dihydroxybenzophenone, a dihydroxy chain extender, a carbonate precursor, and a transesterification catalyst.

In the following specification, the examples, and the claims, which follow, reference will be made to some terms, which are defined as follows. Unless otherwise defined, all technical and scientific terms used herein have the same meaning as commonly understood by one of ordinary skill in the art. In case of conflict, the present document, including definitions, will control. All publications, patent applications, patents and other references mentioned herein are incorporated by reference in their entirety.

The singular forms "a," "an," and "they" include plural referents unless the context clearly dictates otherwise.

As used in the specification and in the claims, the open-ended transitional phrases "comprise(s)," "include(s)," "having," "contain(s)," and variants thereof require the presence of the named ingredients/steps and permit the presence of other ingredients/steps. These phrases should also be construed as disclosing the closed-ended phrases "consist of" or "consist essentially of" that permit only the named ingredients/steps and unavoidable impurities, and exclude other ingredients/steps.

Numerical values for polymers or polymer compositions reflect average values. All numerical values used herein include values that are the same when reduced to the same number of significant figures and values that differ by less than the experimental error of conventional techniques for measuring that value.

All ranges disclosed herein are inclusive of the recited endpoint and independently combinable (e.g., "from 2 grams to 10 grams" includes the endpoints, 2 grams and 10 grams, and all the intermediate values). Each intermediate number with the same degree of precision is explicitly contemplated, e.g. for the range of 6-9, the numbers 7 and 8 are also explicitly contemplated.

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

In recited numeric ranges herein, each intervening number with the same degree of precision is explicitly contemplated. For example, for the range of 6-9, the numbers 7 and 8 are contemplated in addition to 6 and 9, and for the range 6.0-7.0, the number 6.0, 6.1, 6.2, . . . , 6.8, 6.9, and 7.0 are explicitly contemplated.

Compounds are described using standard nomenclature. Any position not substituted by an indicated group is understood to have its valency filled by a bond or a hydrogen atom. A dash ("-") that is not between two letters indicates a point of attachment for a substituent, e.g. —CHO attaches through the carbon atom.

The term "aliphatic" refers to an array of atoms that is not aromatic. The backbone of an aliphatic group is composed exclusively of carbon. An aliphatic group is substituted or unsubstituted. Exemplary aliphatic groups are ethyl and isopropyl.

An "aromatic" radical has a ring system containing a delocalized conjugated pi system with a number of pi-electrons that obeys Hückel's Rule. The ring system may include heteroatoms (e.g. N, S, Se, Si, O), or may be composed exclusively of carbon and hydrogen. Aromatic groups are not substituted. Exemplary aromatic groups include phenyl, thienyl, naphthyl, and biphenyl.

An "ester" radical has the formula —CO—O—, with the carbon atom and the oxygen atom both bonded to carbon atoms. A "carbonate" radical has the formula —O—CO—O—, with the oxygen atoms both bonded to carbon atoms. Note that a carbonate group is not an ester group, and an ester group is not a carbonate group.

A "hydroxyl" radical has the formula —OH, with the oxygen atom bonded to a carbon atom. A "carboxy" or "carboxyl" radical has the formula —COOH, with the carbon atom bonded to another carbon atom. A carboxyl group can be considered as having a hydroxyl group. However, please note that a carboxyl group participates in certain reactions differently from a hydroxyl group. An "anhydride" radical has the formula —CO—O—CO—, with the carbonyl carbon atoms bonded to other carbon atoms. This radical can be considered equivalent to two carboxyl groups.

The term "alkyl" refers to a fully saturated radical composed entirely of carbon atoms and hydrogen atoms. The alkyl radical may be linear, branched, or cyclic. The term "cycloalkyl" refers to cyclic aliphatic radicals, such as cyclobutyl, cyclopentyl or cyclohexyl. The term "aryl" refers to an aromatic radical composed exclusively of carbon and hydrogen. Exemplary aryl groups include phenyl, naphthyl, and biphenyl. The term "hydrocarbon" refers to a radical which is composed exclusively of carbon and hydrogen. Both alkyl and aryl groups are considered hydrocarbon groups.

The term "heteroaryl" refers to an aromatic radical having a ring system that is composed of carbon, hydrogen, and at least one heteroatom. Exemplary heteroaryl groups include pyridyl, furanyl, and thienyl. Note that "heteroaryl" is a subset of aromatic, and is exclusive of "aryl".

The term "halogen" refers to fluorine, chlorine, bromine, and iodine.

The term "alkoxy" refers to an alkyl radical which is attached to an oxygen atom, i.e. —O—$C_nH_{2n+1}$. The term "aryloxy" refers to an aryl radical which is attached to an oxygen atom, e.g. —O—$C_6H_5$.

An "alkenyl" radical is composed entirely of carbon atoms and hydrogen atoms and contains a carbon-carbon double bond that is not part of an aromatic structure. An exemplary alkenyl radical is vinyl (—CH=$CH_2$).

The term "alkenyloxy" refers to an alkenyl radical which is attached to an oxygen atom, e.g. —O—CH=$CH_2$. The term "arylalkyl" refers to an aryl radical which is attached to an alkyl radical that connects to the parent molecular moiety, e.g. benzyl (—$CH_2$—$C_6H_5$). The term "alkylaryl" refers to an alkyl radical which is attached to an aryl radical that connects to the parent molecular moiety, e.g. tolyl (—$C_6H_4$—$CH_3$).

The term "substituted" refers to at least one hydrogen atom on the named radical being substituted with another functional group, such as halogen, —CN, or —$NO_2$. However, the functional group is not hydroxyl, carboxyl, ester, acid halide, or anhydride. Besides the aforementioned functional groups, an aryl group may also be substituted with alkyl or alkoxy. An exemplary substituted aryl group is methylphenyl.

The term "copolymer" refers to a polymer having two or more repeating units. A homopolymer has only one repeating unit.

The terms "Glass Transition Temperature" or "Tg" refer to the maximum temperature that a polycarbonate will retain at least one useful property such as impact resistance, stiffness, strength, or shape retention. The Tg can be determined by differential scanning calorimetry. The calorimetry method may use a TA Instruments Q1000 instrument, for example, with setting of 20° C./min ramp rate and 40° C. start temperature and 200° C. end temperature.

The term "haze" refers to the percentage of transmitted light, which in passing through a specimen deviates from the incident beam by forward scattering. Percent (%) haze may be measured according to ASTM D 1003-07.

The term "Melt Volume Rate" (MVR) or "Melt Flow Rate (MFR)" refers to the flow rate of a polymer in a melt phase as determined using the method of ASTM D1238-10. MVR is expressed in cubic centimeter per 10 minutes, and MFR is expressed in grams per 10 minutes. The higher the MVR or MFR value of a polymer, the greater the flow of that polymer for a given temperature.

The term "percent light transmission" or "% T" is the ratio of transmitted light to incident light, and may be measured according to ASTM D 1003-07.

"Polycarbonate" as used herein refers to an oligomer or a polymer comprising residues of one or more monomers, joined by carbonate linkages.

The term "crosslink" and its variants refer to the formation of a stable covalent bond between two polymers/oligomers. This term is intended to encompass the formation of covalent bonds that result in network formation, or the formation of covalent bonds that result in chain extension. The term "cross-linkable" refers to the ability of a polymer/oligomer to form such stable covalent bonds.

The present disclosure refers to "polymers," "oligomers", and "compounds". A polymer is a large molecule composed of multiple repeating units chained together. Different molecules of a polymer will have different lengths, and so a polymer has a molecular weight that is based on the average value of the molecules (e.g. weight average or number average molecular weight (Mw, Mn)). An "oligomer" has only a few repeating units, while a "polymer" has many repeating units. In this disclosure, "oligomer" refers to molecules having a weight average molecular weight (Mw) of less than 15,000 Daltons, and the term "polymer" refers to molecules having an Mw of 15,000 Daltons or more, as measured by GPC using polycarbonate molecular weight standards, measured prior to any ultraviolet (UV) exposure. In a compound, all molecules have the same molecular weight. Molecular weight determinations may be performed using gel permeation chromatography (GPC), using a cross-linked styrene-divinylbenzene column and calibrated to polycarbonate references using a UV-VIS detector set at 264 nm, or alternatively using a refractive index detector. Samples may be prepared at a concentration of about 1 mg/ml, and eluted at a flow rate of about 1.0 ml/min.

The present disclosure relates to photoactive additives (PAA), and to processes for making such additives, especially additives in the form of cross-linkable polycarbonate resins. When added to polymeric base resin(s) and then exposed to UV light of the appropriate wavelength, the resulting composition will have, for example, one or both of improved anti-drip and flame retardant properties compared to the base resin(s) alone or to the composition prior to the UV irradiation. The additive can be used to provide thin-walled materials that are UL94 5 VA compliant and highly transparent.

Generally, the photoactive additives (PAA) of the present disclosure are cross-linkable polycarbonate resins that contain photoactive ketone groups. The term "photoactive" refers to a moiety that, when exposed to ultraviolet light of the appropriate wavelength, crosslinks with another molecule. For example, the bisphenol-A monomer in a bisphenol-A homopolycarbonate is not considered to be photoactive, even though photo-Fries rearrangement can occur, because the atoms do not crosslink, but merely rearrange in the polymer backbone. A "ketone group" is a carbonyl group (—CO—) that is bonded to two other carbon atoms (i.e. —R—CO—R'—). An ester group and a carboxylic acid group are not a ketone group because their carbonyl group is bonded to an oxygen atom.

The photoactive additives of the present disclosure are made using a melt polymerization process. As a result, they can be made without using the hazardous substances phosgene and dichloromethane, simplifying the manufacturing process. In particular, a cross-linkable polycarbonate resin can be produced by the reaction of a hydroxybenzophenone and a dihydroxy chain extender with a carbonate precursor in the presence of a transesterification catalyst, and may optionally include an end-capping agent. The reaction product of this mixture is the photoactive additive, which in particular embodiments is a cross-linkable polycarbonate resin.

In the present disclosure, the photoactive moiety is provided by a benzophenone moiety. The benzophenone moiety may be part of a dihydroxy chain extender, or the carbonate precursor, or the end-capping agent. These potential benzophenone sources are first discussed, and then the other components of the reaction mixture are discussed.

In some embodiments, the benzophenone moiety is part of a monohydroxybenzophenone, and has the structure of Formula (I):

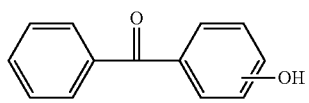

Formula (I)

In more specific embodiments, the monohydroxybenzophenone is 4-hydroxybenzophenone (4-HBP) or 3-hydroxybenzophenone (3-HBP). When used, the monohydroxybenzophenone is present as an end-capping agent.

In other embodiments, the benzophenone moiety is part of a dihydroxybenzophenone, and has the structure of Formula (II):

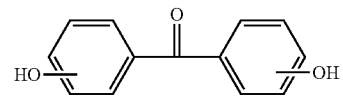

Formula (II)

The two hydroxyl groups can be located in any combination of locations, e.g. 4,4'-; 2,2'-; 2,4'-; etc. In more specific embodiments, the dihydroxybenzophenone is 4,4'-dihydroxybenzophenone (4,4'-DHBP). When used, the dihydroxybenzophenone is added to the reaction mixture as a dihydroxy chain extender.

In yet other embodiments, the benzophenone moiety is part of a bis-carbonate of a benzophenone, and has the structure of Formula (III):

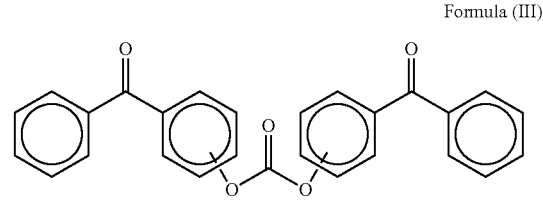

Formula (III)

In more specific embodiments, the bis-carbonate is the bis-carbonate of 4-hydroxybenzophenone. When used, the bis-carbonate is added to the reaction mixture as a carbonate precursor. During reaction, using this carbonate precursor results in benzophenone endcaps.

Any combination of the benzophenones of Formula (I)-(III) may be used in the reaction mixture to form the photoactive additive. However, in particular embodiments of the processes described herein, only one of the benzophenones of Formula (I)-(III) is used. Put another way, the resulting photoactive additive is (a) a cross-linkable polycarbonate resin that contains repeating units derived from the dihydroxybenzophenone of Formula (II) and does not contain benzophenone endcaps, or (b) the cross-linkable polycarbonate resin contains benzophenone endcaps derived from the compounds of Formulas (I) or (III), and does not contains repeating units derived from the dihydroxybenzophenone of Formula (II).

Continuing, the reaction mixture also includes a dihydroxy chain extender. The dihydroxy chain extender is a molecule that contains only two hydroxyl groups. It is contemplated that the dihydroxy chain extender can be a diol or a diacid. The dihydroxy chain extender is not photoactive when exposed to light. The chain extender can be used to provide a desired level of miscibility when the additive is mixed with other polymeric resins. The photoactive additive may comprise from about 75 mole % to about 99.5 mole %, or from 95 mole % to about 99 mole %, or from about 80 mole % to about 95 mole %, or from about 80 mole % to about 90 mole %, of the dihydroxy chain extender.

A first exemplary dihydroxy chain extender is a bisphenol of Formula (A):

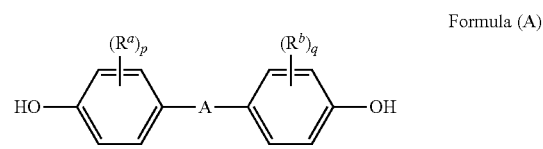

Formula (A)

wherein $R^a$ and $R^b$ each represent a halogen atom or a monovalent hydrocarbon group and may be the same or different; p and q are each independently integers of 0 to 4; and A represents one of the groups of Formula (A-1):

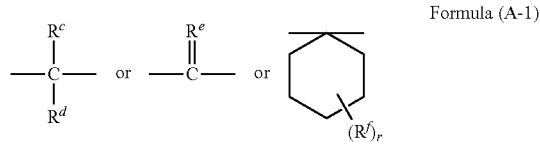

Formula (A-1)

wherein $R^c$ and $R^d$ each independently represent a hydrogen atom or a monovalent linear or cyclic hydrocarbon group; $R^e$ is a divalent hydrocarbon group; $R^f$ is a monovalent linear hydrocarbon group; and r is an integer from 0 to 5. For example, A can be a substituted or unsubstituted $C_3$-$C_{18}$ cycloalkylidene.

Specific examples of the types of bisphenol compounds that may be represented by Formula (A) include 2,2-bis(4-hydroxyphenyl) propane (hereinafter "bisphenol-A" or "BPA"); 4,4'-(1-phenylethane-1,1-diyl)diphenol or 1,1-bis(4-hydroxyphenyl)-1-phenyl-ethane (bisphenol-AP); 1,1-bis(4-hydroxyphenyl)-3,3,5-trimethylcyclohexane (bisphenol TMC); 1,1-bis(4-hydroxy-3-methylphenyl) cyclohexane (DMBPC); and 2,2-bis(4-hydroxy-3,5-dimethylphenyl) propane (tetramethyl bisphenol-A).

A second exemplary dihydroxy chain extender is a bisphenol of Formula (B):

Formula (B)

wherein each $R^k$ is independently a $C_{1-10}$ hydrocarbon group, and n is 0 to 4. The halogen is usually bromine. Examples of compounds that may be represented by Formula (B) include resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone.

A third exemplary dihydroxy chain extender is a bisphenolpolydiorganosiloxane of Formula (C-1) or (C-2):

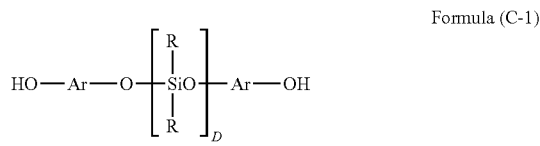

Formula (C-1)

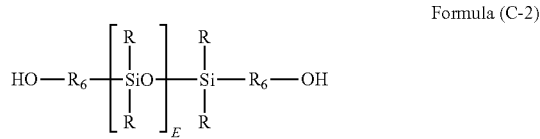

Formula (C-2)

wherein each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, including from about 2 to about 500, or about 10 to about 200, or more specifically about 10 to about 75.

Specific examples of Formulas (C-1) and (C-2) are illustrated below as Formulas (C-a) through (C-d):

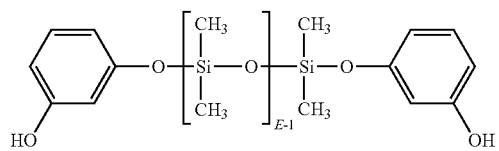

Formula (C-a)

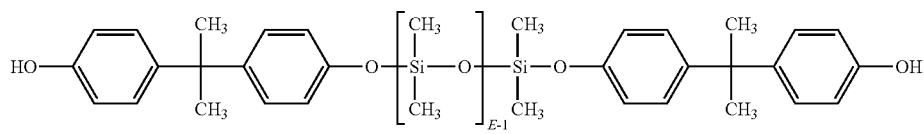

Formula (C-b)

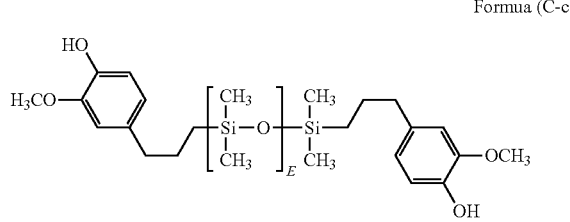

Formua (C-c)

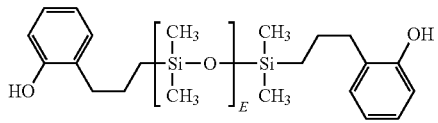

Formula (C-d)

where E is an average value from 10 to 200.

A fourth exemplary dihydroxy chain extender is an aliphatic diol of Formula (D):

Formula (D)

wherein each X is independently hydrogen, halogen, or alkyl; and j is an integer from 1 to 20. Examples of an aliphatic diol include ethylene glycol, propanediol, 2,2-dimethyl-propanediol, 1,6-hexanediol, and 1,12-dodecanediol.

A fifth exemplary dihydroxy chain extender is a dihydroxy compound of Formula (E), which may be useful for high heat applications:

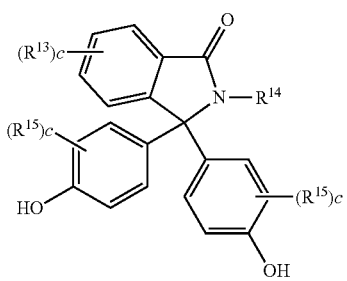

Formula (E)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4. In a specific embodiment, $R^{14}$ is a $C_1$-$C_6$ alkyl or phenyl group. In still another embodiment, $R^{14}$ is a methyl or phenyl group. In another specific embodiment, each c is 0. Compounds of Formula (E) include 3,3-bis(4-hydroxyphenyl)-2-phenylisoindolin-1-one (PPPBP).

Another dihydroxy compound that might impart high Tgs to the polycarbonate has adamantane units. Such compounds may have repeating units of the following formula (F) for high heat applications:

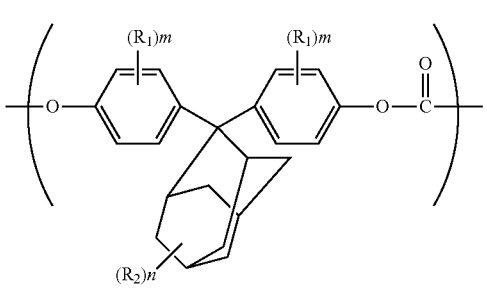

Formula (F)

wherein $R_1$ is halogen, $C_1$-$C_6$ alkyl, $C_1$-$C_6$ alkoxy, $C_6$-$C_{12}$ aryl, $C_7$-$C_{13}$ aryl-substituted alkenyl, or $C_1$-$C_6$ fluoroalkyl; $R_2$ is halogen, $C_1$-$C_{12}$ alkyl, $C_1$-$C_{12}$ alkoxy, $C_6$-$C_{12}$ aryl, $C_7$-$C_{13}$ aryl-substituted alkenyl, or $C_1$-$C_{12}$ fluoroalkyl; m is an integer of 0 to 4; and n is an integer of 0 to 14.

Another dihydroxy compound that might impart high Tgs to the polycarbonate is a fluorene-unit containing dihydroxy compound represented by the following Formula (G):

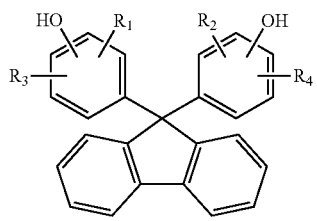

Formula (G)

wherein $R_1$ to $R_4$ are each independently hydrogen, $C_1$-$C_9$ hydrocarbon, or halogen.

Another dihydroxy chain extender that could be used is an isosorbide. One monomer unit derived from isosorbide is an isorbide-bisphenol unit of Formula (H):

Formula (H)

wherein $R_1$ is an isosorbide unit and $R_2$-$R_9$ are each independently a hydrogen, a halogen, a $C_1$-$C_6$ alkyl, a methoxy, an ethoxy, or an alkyl ester.

The $R_1$ isosorbide unit may be represented by Formula (H-a):

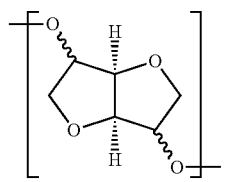

Formula (H-a)

The isosorbide unit may be derived from one isosorbide, or be a mixture of isomers of isosorbide. The stereochemistry of Formula (I) is not particularly limited. These diols may be prepared by the dehydration of the corresponding hexitols. Isosorbides are available commercially from various chemical suppliers including Cargill, Roquette, and Shanxi. The isosorbide-bisphenol may have a pKa of between 8 and 11.

While the compounds of Formulas (A)-(H) are diols, diacids may also be used as the dihydroxy chain extender. Some exemplary diacids include those having the structures of one of Formulas (1)-(2):

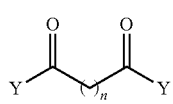

Formula (1)

-continued

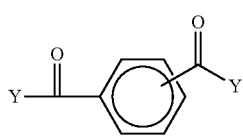

Formula (2)

where Y is hydroxyl, halogen, alkoxy, or aryloxy; and where n is 1 to 20. It should be noted that Formula (1) encompasses adipic acid (n=4), sebacic acid (n=8), and dodecanedioic acid (n=10). Similarly, Formula (2) encompasses isophthalic acid and terephthalic acid. When diacids are used, the crosslinkable polycarbonate of the present disclosure may be a polyester-polycarbonate. The molar ratio of ester units to carbonate units in the polyester-polycarbonate may be 1:99 to 99:1, specifically 10:90 to 90:10, more specifically 25:75 to 75:25.

The reaction mixture used in the melt polymerization processes of the present disclosure also includes a carbonate precursor. The carbonate precursor is a phosgene substitute that serves as a carbonyl source. In particular, the carbonate precursor may be a diaryl carbonate. Exemplary diaryl carbonates include for example diphenyl carbonate (DPC), bismethyl salicyl carbonate (BMSC), ditolyl carbonate, bis(chlorophenyl) carbonate, m-cresyl carbonate, and dinaphthyl carbonate.

Particularly contemplated for use in the processes of the present disclosure are diphenyl carbonate (DPC), bismethyl salicyl carbonate (BMSC), and the bis-carbonate of 4-hydroxybenzophenone. These three compounds are illustrated below as Formulas (3), (4), and (III-a), respectively:

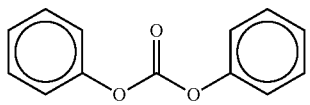

Formula (3)

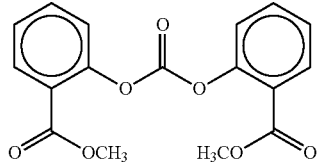

Formula (4)

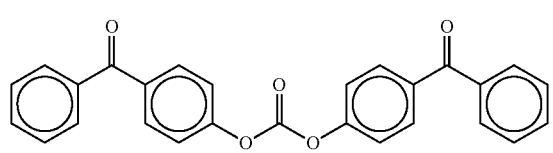

Formula (III-a)

A molar ratio of the carbonate precursor to the total amount of dihydroxy monomers in the melt polymerization reaction can be 1.5:1 to 1:1.5, or 1.2:1 to 1.2:1, or 1:1 to 1.1:1, or 1:1 to 1.08:1. When the benzophenone is used to form endcaps, the molar ratio of the benzophenone to the carbonate precursor can be from 1:2 to 1:200 prior to UV exposure, including from about 1:10 to about 1:200 or from about 1:20 to about 1:200. When the benzophenone is a dihydroxybenzophenone, the molar ratio of the benzophenone to the carbonate precursor can be from 1:1 to 1:200 prior to UV exposure, including from 1:2 to 1:200, or from about 1:99 to about 3:97, or from about 1:99 to about 6:94, or from about 10:90 to about 25:75 or from about 1:3 to about 1:200.

The reaction mixture used in the melt polymerization processes of the present disclosure also includes a transesterification catalyst. The transesterification catalyst can comprise one or both of an alkali catalyst and a quaternary catalyst. The quaternary catalyst comprises one or both of a quaternary ammonium compound and a quaternary phosphonium compound. The alkali catalyst comprises a source of one or both of an alkali ion and an alkaline earth metal ion. In particular embodiments, an alkali catalyst and a quaternary catalyst are used. In other embodiments, only a quaternary catalyst is used, and no alkali catalyst is used.

The alkali catalyst is an alkali and/or an alkaline earth metal hydroxide, an alkali and/or alkaline earth metal salt of a carboxylic acid, or an alkali and/or alkaline earth metal salt of a non-volatile inorganic acid. Exemplary alkali metal hydroxides include lithium hydroxide, sodium hydroxide, and potassium hydroxide. Exemplary alkaline earth metal hydroxides include magnesium hydroxide and calcium hydroxide. Exemplary salts of carboxylic acids include sodium acetate and derivatives of ethylene diamine tetraacetic acid (EDTA) such as EDTA tetrasodium salt, or EDTA magnesium disodium salt. Exemplary salts of a non-volatile inorganic acid include $NaH_2PO_3$, $NaH_2PO_4$, $Na_2HPO_3$, $KH_2PO_4$, $CsH_2PO_4$, and $Cs_2HPO_4$; and mixed alkali metal salts of phosphoric acid such as $NaKHPO_4$, $CsNaHPO_4$, and $CsKHPO_4$. When the alkali catalyst comprises $NaKHPO_4$, a molar ratio of Na to K can be 0.5 to 2. The alkali catalyst typically will be used in an amount sufficient to provide a molar ratio of $1 \times 10^{-3}$ to $1 \times 10^{-8}$ moles of alkali catalyst per mole of the dihydroxy compounds present in the reaction mixture.

The alkali catalyst can comprise an alkali metal compound, wherein the amount of sodium can be greater than or equal to 1 ppm, or greater than or equal to 30 ppm, or greater than or equal to 100 ppm; the amount of cesium can be greater than or equal to 10 ppm, or greater than or equal to 30 ppm, or greater than or equal to 50 ppm; the amount of potassium can be greater than 0 ppm, or greater than or equal to 5 ppm, or greater than or equal to 10 ppm; or a combination comprising one or more of the foregoing, wherein the metal amounts are based on the weight of the catalyst.

The alkali catalyst can comprise an alkali metal compound, wherein if the metal compound comprises sodium sulfate, the amount of sodium can be less than or equal to 1,690 ppm, specifically, less than or equal to 1,670 ppm based on the total weight of the catalyst compound; if the metal compound comprises cesium sulfate, the amount of cesium can be less than or equal to 275 ppm, specifically, less than or equal to 252 ppm based on the total weight of the catalyst compound; if the metal compound comprises sodium hydroxide, the amount of sodium can be less than or equal to 35 ppm, specifically, less than or equal to 29 ppm based on the total weight of the catalyst compound; if the metal compound comprises potassium hydroxide, the amount of potassium can be less than or equal to 50 ppm, specifically, less than or equal to 43 ppm based on the total weight of the catalyst compound; if the metal compound comprises cesium hydroxide, the amount of cesium can be less than or equal to 140 ppm, specifically, less than or equal to 132 ppm based on the total weight of the respective catalyst; or a combination comprising one or more of the foregoing.

Quaternary catalysts can include a quaternary ammonium compound, a quaternary phosphonium compound, or a combination thereof. The quaternary ammonium compound can be an organic ammonium compound having the structure $N(R_m)_4^+X$, wherein each $R_m$ is independently $C_{1-20}$ alkyl, $C_{4-20}$ cycloalkyl, or $C_{6-20}$ aryl; and X is an organic or inorganic anion such as hydroxide, halide, carboxylate, sulfonate, sulfate, formate, carbonate, or bicarbonate. Exemplary quaternary ammonium compounds are tetramethyl ammonium hydroxide, tetrabutyl ammonium hydroxide, tetramethyl ammonium acetate, tetramethyl ammonium formate, and tetrabutyl ammonium acetate.

The quaternary phosphonium compound can be an organic phosphonium compound having the structure $P(R_m)_4^+X$, wherein each $R_m$ is independently $C_{1-20}$ alkyl, $C_{4-20}$ cycloalkyl, or $C_{6-20}$ aryl; and X is an organic or inorganic anion such as hydroxide, halide, carboxylate, sulfonate, sulfate, formate, carbonate, or bicarbonate. Exemplary quaternary phosphonium compounds include tetramethyl phosphonium hydroxide, tetramethyl phosphonium acetate, tetrabutyl phosphonium acetate (TBPA), tetraphenyl phosphonium acetate (TPPA), tetramethyl phosphonium formate, tetrabutyl phosphonium hydroxide, and tetraphenyl phosphonium phenoxide (TPPP).

The quaternary catalyst typically will be used in an amount sufficient to provide a molar ratio of $1 \times 10^{-2}$ to $1 \times 10^{-6}$ moles of quaternary catalyst per mole of the dihydroxy compounds present in the reaction mixture.

Preferred alkali catalysts are sodium hydroxide (NaOH) or $NaKHPO_4$. Preferred quaternary catalysts are tetraphenyl phosphonium acetate, tetramethyl ammonium hydroxide (TMAH), and tetra-butylphosphonium acetate (TBPA). In some embodiments, the mole ratio of the alkali catalyst to the dihydroxy chain extender(s) is from about $0.5 \times 10^{-6}:1$ to about $1.0 \times 10^{-6}:1$. In some embodiments, the mole ratio of the quaternary catalyst to the dihydroxy chain extender(s) is from about $40 \times 10^{-6}:1$ to about $300 \times 10^{-6}:1$.

If desired, the reaction mixture can include branching agents that contain three, four, or even more functional groups. The functional groups can be, for example, hydroxyl groups or carboxylic acid groups. Generally speaking, these react in the same way as the dihydroxy chain extender. Branching agents with three hydroxyl groups include 1,1,1-trimethoxyethane; 1,1,1-trimethoxymethane; 1,1,1-tris (hydroxyphenyl) ethane (THPE), and 1,3,5-tris[2-(4-hydroxyphenyl)-propan-2-yl]benzene. Branching agents with four hydroxyl groups include pentaerythritol and 4-[2,6,6-tris(4-hydroxyphenyl)heptan-2-yl]phenol. In other embodiments, the branching agent can be an oligomer, made from epoxidized novolac monomer, that permits the desired number of functional groups to be provided.

Branching agents having three carboxylic acid groups include benzenetricarboxylic acid, citric acid, and cyanuric chloride. Branching agents having four carboxylic acid groups include benzenetetracarboxylic acid, biphenyl tetracarboxylic acid, and benzophenone tetracarboxylic dianhydride. The corresponding acyl halides and esters of such acids are also contemplated. Oligomers containing glycidyl methacrylate monomers with styrene or methacrylate monomers are also contemplated.

An end-capping agent can be used to terminate any polymer chains of the photoactive additive. The end-capping agent (i.e. chain stopper) can be a monohydroxy compound, a mono-acid compound, or a mono-ester compound. Exemplary endcapping agents include phenol, p-cumylphenol (PCP), p-tert-butylphenol, octylphenol, p-cyanophenol, and p-methoxyphenol. Unless modified with other adjectives, the term "end-capping agent" refers to a compound that is not photoactive when exposed to light. The photoactive additive may comprise about 0.5 mole % to about 5.0 mole % endcap groups derived from this non-photoactive end-capping agent. It is noted that when a benzophenone moiety of Formula (I) or Formula (III) is used, that benzophenone moiety acts as an end-capping agent. In that situation, a second non-photoactive end-capping agent can also be used. The photoactive additive may comprise about 0.5 mole % to about 5.0 mole % endcap groups derived from each end-capping agent, including about 1 mole % to about 3 mole %, or from about 1.7 mole % to about 2.5 mole %, or from about 2 mole % to about 2.5 mole %, or from about 2.5 mole % to about 3.0 mole % endcap groups derived from each end-capping agent based on total moles of photoactive additive with the endcap groups.

The photoactive additives of the present disclosure have photoactive groups that are derived from either a bis-carbonate of a benzophenone, a monohydroxybenzophenone, or a dihydroxybenzophenone. When a bis-carbonate of a benzophenone or a monohydroxybenzophenone is used, the reaction mixture generally includes only one dihydroxy chain extender which provides a monomer, and the benzophenone acts as an endcapping agent. The resulting additive can be considered a homopolymer. When a dihydroxybenzophenone is used, the reaction mixture generally also includes another dihydroxy chain extender, and the resulting additive is a copolymer with the dihydroxybenzophenone and the dihydroxy chain extender acting as monomers.

The cross-linkable polycarbonate resins of the present disclosure can be an oligomer or a polymer. The oligomer has a weight average molecular weight (Mw) of less than 15,000 Daltons, including 10,000 Daltons or less. The polymeric polycarbonates of the present disclosure have a Mw of 15,000 Daltons or higher. In particular embodiments, the Mw is 17,000 to 80,000 Daltons, or 17,000 to 35,000 Daltons. These molecular weights are measured prior to any UV exposure.

One example of a photoactive additive is a cross-linkable polycarbonate resin shown in FIG. 1. Here, 4,4'-dihydroxybenzophenone (4,4'-DHBP) is reacted with diphenyl carbonate (carbonate precursor) and bisphenol-A (BPA, dihydroxy chain extender) in the presence of a transesterification catalyst to obtain the cross-linkable polycarbonate resin. A copolymer is thus formed with a weight average molecular weight and a polydispersity index, and containing carbonate linkages. The molar ratio of BPA to DHBP is m:n. This notation is intended to report the relative molar amounts between the BPA units and the DHBP units, and should not be construed as denoting the structure of the copolymer (i.e. not necessarily a block copolymer).

Figure 2:
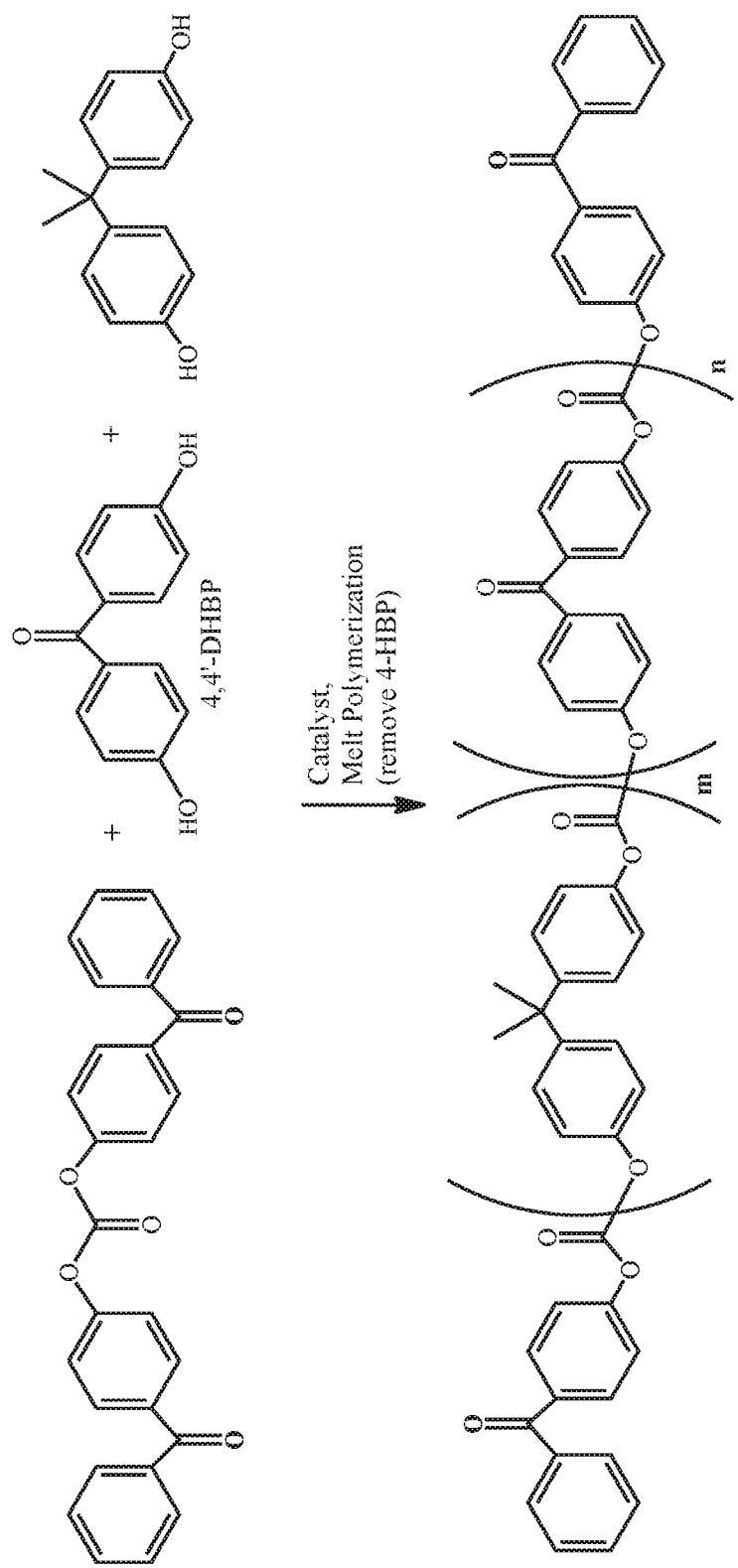
FIG. 2 illustrates the formation of another photoactive additive (oligomer/polymer) from a dihydroxybenzophenone, a dihydroxy chain extender, a carbonate precursor, and a catalyst. Here, the catalyst results in the formation of hydroxybenzophenone endcaps as well.

Another example of a photoactive additive is a cross-linkable polycarbonate resin shown in FIG. 2. Here, 4,4'-DHBP is reacted with the bis-carbonate of 4-hydroxybenzophenone (carbonate precursor) and bisphenol-A (dihydroxy chain extender) in the presence of a transesterification catalyst to obtain the cross-linkable polycarbonate resin. The resulting copolymer has hydroxybenzophenone endcaps.

Figure 3:
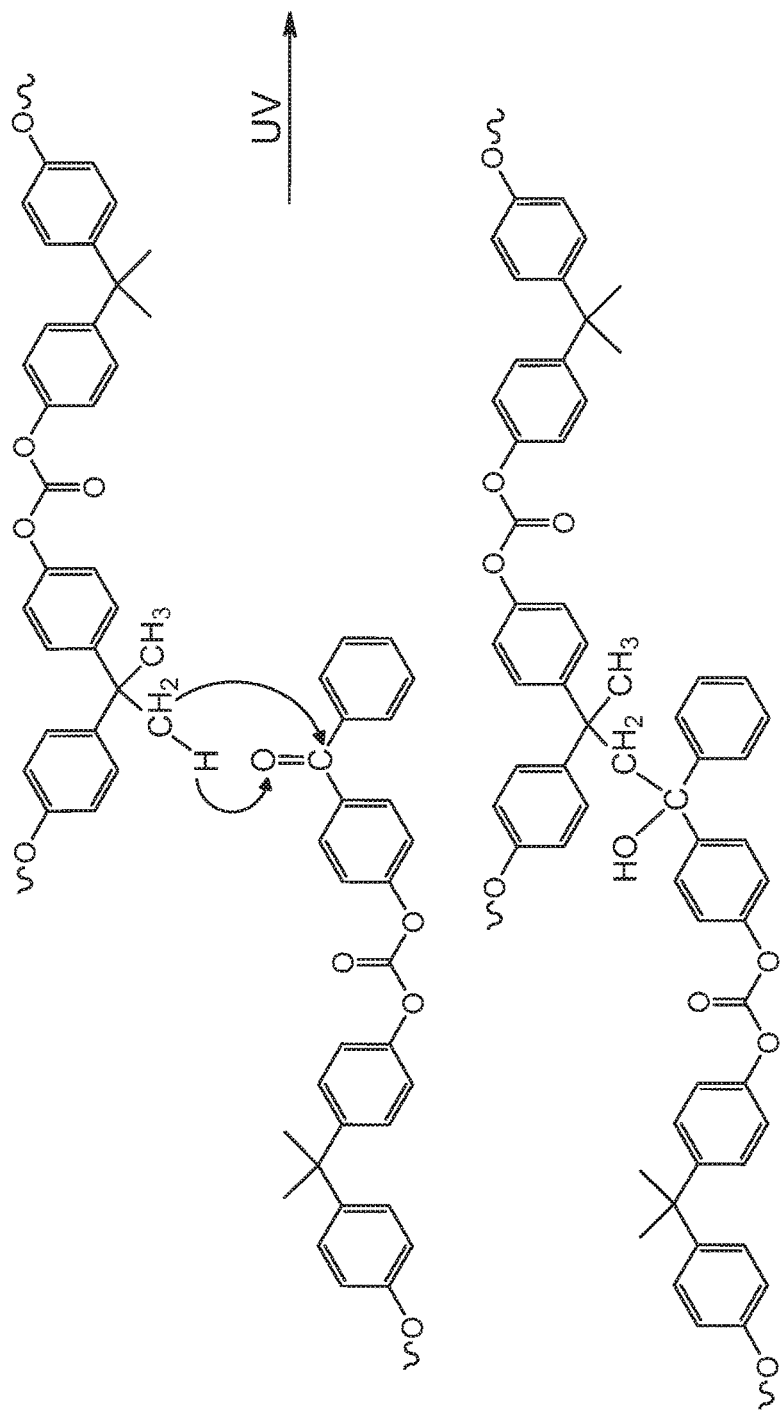
FIG. 3 illustrates the crosslinking mechanism of the photoactive additive. A hydrogen atom is abstracted from a methyl group in a bisphenol-A monomer by an excited benzophenone, with subsequent recombination of the radicals, forming an adduct with a hydroxyl group on the former acyl carbon.

The crosslinking mechanism is believed to be due to hydrogen abstraction by the ketone group from an alkyl group that acts as a hydrogen donor and subsequent coupling of the resulting radicals. This mechanism is illustrated in FIG. 3 with reference to a benzophenone (the photoactive moiety) and a bisphenol-A (BPA) monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group.

Figure 4:
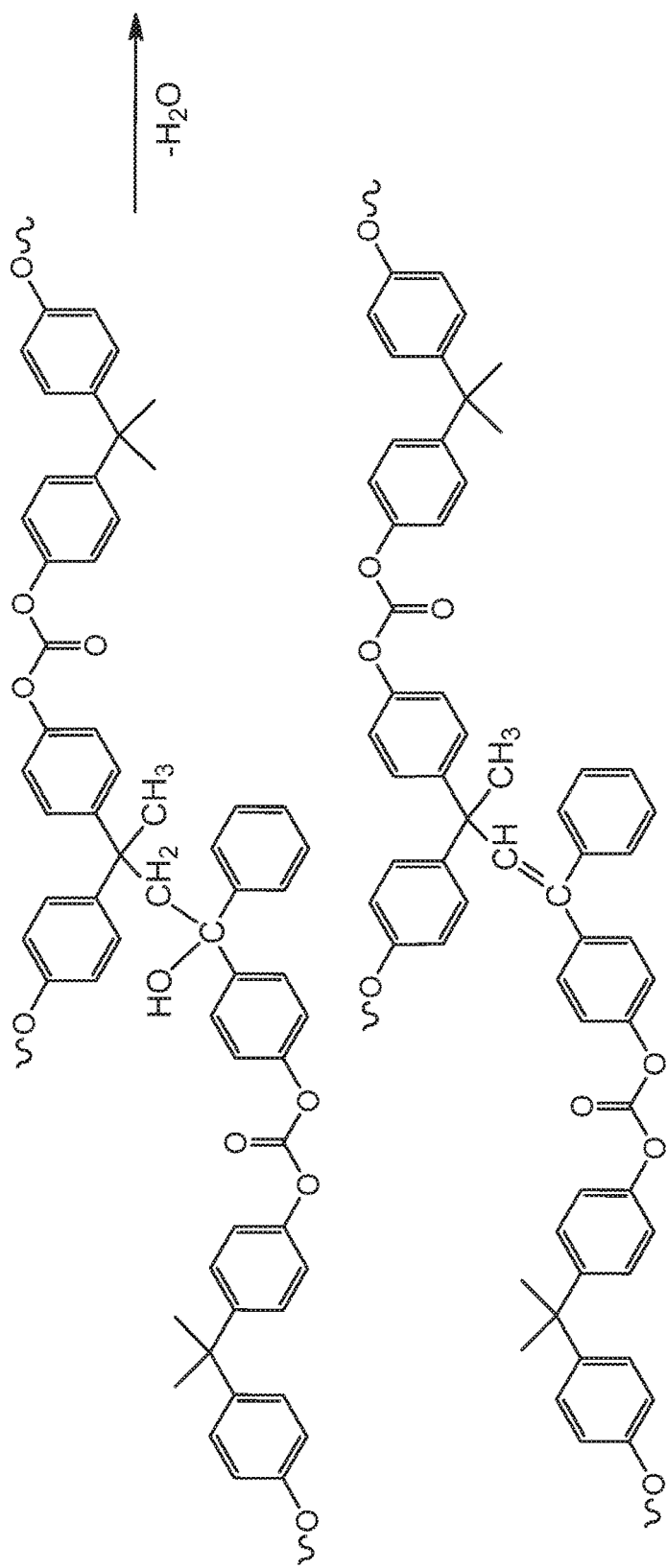
FIG. 4 illustrates a post-crosslinking mechanism that may occur through dehydration of the hydroxyl moiety formed by crosslinking in the additive of FIG. 4.

FIG. 4 illustrates one potential reaction after crosslinking has occurred. As a result of dehydration, a carbon-carbon double bond may form between the carbon of the former ketone group of the benzophenone monomer and the carbon of the former methyl group of the BPA monomer. Formation of this conjugated double bond is favored due to the adjacent benzene rings.

In some embodiments, the photoactive additive is a cross-linkable polycarbonate resin comprising repeating units derived from a dihydroxybenzophenone monomer (i.e. of Formula (II)). The cross-linkable polycarbonate resin may comprise from about 0.5 mole % to about 50 mole % of repeating units derived from the dihydroxybenzophenone. In more particular embodiments, the cross-linkable polycarbonate resin comprises from about 1 mole % to about 3 mole %, or from about 1 mole % to about 5 mole %, or from about 1 mole % to about 6 mole %, or from about 5 mole % to about 20 mole %, or from about 10 mole % to about 20 mole %, or from about 0.5 mole % to about 25 mole % of repeating units derived from the dihydroxybenzophenone.

In more specific embodiments, the photoactive cross-linkable polycarbonate resin is a copolymer formed from the reaction of a dihydroxybenzophenone (i.e, a first dihydroxy chain extender), a second dihydroxy chain extender, a carbonate precursor, and one or more end-capping agents. The copolymer contains from about 0.5 mole % to 50 mole % of repeating units derived from the dihydroxybenzophenone, and from about 50 mole % to 99.5 mole % of repeating units derived from the second dihydroxy chain extender. Most desirably, the dihydroxybenzophenone is 4,4'-dihydroxybenzophenone. Usually, the dihydroxy chain extender is bisphenol-A.

In particular embodiments, the cross-linkable polycarbonate is a copolymer consisting of repeating units derived from 4,4'-dihydroxybenzophenone and bisphenol-A, with endcaps that are not photoactive. The copolymer contains from about 0.5 mole % to 50 mole % of repeating units derived from the dihydroxybenzophenone, and from about 50 mole % to 99.5 mole % of repeating units derived from the bisphenol-A.

In more specific embodiments, the photoactive cross-linkable polycarbonate resin is a terpolymer formed from the dihydroxybenzophenone (i.e, a first dihydroxy chain extender), a second dihydroxy chain extender, a third dihydroxy chain extender, carbonate precursor, and one or more end-capping agents. The terpolymer contains from about 0.5 mole % to 50 mole % of repeating units derived from the dihydroxybenzophenone, from about 50 mole % to 99.5 mole % of repeating units derived from the second dihydroxy chain extender, and from about 50 mole % to 99.5 mole % of repeating units derived from the third dihydroxy chain extender. The three dihydroxy chain extenders are different from each other. In particular embodiments, the dihydroxybenzophenone is 4,4'-dihydroxybenzophenone. Usually, the second dihydroxy chain extender is bisphenol-A. The third dihydroxy chain extender, in particular embodiments, is selected from tetramethyl bisphenol-A (TMBPA), methylhydroquinone, or 1,1-bis(4-hydroxy-3-methylphenyl) cyclohexane (DMBPC).

In other embodiments, the photoactive additive is a cross-linkable polycarbonate resin comprising endcap groups derived from a monohydroxybenzophenone monomer (i.e. of Formula (I)) or the bis-carbonate of a benzophenone (i.e. of Formula (III)). The cross-linkable polycarbonate resin may comprise about 0.5 mole % to about 5 mole % endcap groups derived from the benzophenone, including from about 1 mole % to about 3 mole, or from about 1.7 mole % to about 2.5 mole %, or from about 2 mole % to about 2.5 mole %, or from about 2.5 mole % to about 3.0 mole % endcap groups derived from the benzophenone of Formula (I) or Formula (III) based on the total moles of the cross-linkable polycarbonate resin comprising the end-cap groups.

In more specific embodiments, the photoactive cross-linkable polycarbonate resin is a homopolymer formed from the benzophenone of Formula (I) or Formula (III), a dihydroxy chain extender, and a carbonate precursor. Usually, the dihydroxy chain extender is bisphenol-A. In particular embodiments, the cross-linkable polycarbonate is a bisphenol-A homopolycarbonate consisting of repeating units derived from bisphenol-A, with the photoactive benzophenone endcaps.

In particular embodiments, the photoactive cross-linkable polycarbonate contains about 0.5 mole % of endcaps derived from a benzophenone, and has a weight-average molecular weight (Mw) from 17,000 to 30,000 Daltons. In other specific embodiments, the photoactive cross-linkable polycarbonate contains about 2.5 mole % of endcaps derived from a benzophenone, and has a weight-average molecular weight (Mw) from 24,000 to 31,000 Daltons. In still other definite embodiments, the photoactive cross-linkable polycarbonate has an MVR of 8 to 10 cc/10 min at 300° C./1.2 kg.

The cross-linkable polycarbonates of the present disclosure include homopolycarbonates and copolymers. For reference, the term "dipolymer" refers to copolymers derived specifically from two different monomers, and the term "terpolymer" refers to copolymers derived specifically from three different monomers. wherein an endcapping agent is not considered a monomer.

The monomers may be randomly incorporated into the polycarbonate resin. A random polymer may have several block sequences and alternate sequences that follow a statistical distribution. In a random x:(y):(1−(x+y)) terpolymer, wherein x is the mole percent of a first monomer, y is the mole percent of a second monomer and 1−(x+y) is the mole percent of the other monomer, one can calculate the distribution of each monomer using peak area values determined by $^{13}$C NMR, for example. The terpolymer can be an alternating terpolymer with alternating I, O, and R units (—I—O—R—I—O—R—I—O—R—I—O—R—), or I, O, and R units arranged in a repeating sequence (e.g. a periodic terpolymer having the formula: (I—O—R—I—I—O—O—R—R—I—I—I—O—O—O—R—R—R)n). The cross-linkable polycarbonate terpolymer may be a statistical terpolymer in which the sequence of monomer residues follows a statistical rule. The terpolymer may also be a block terpolymer that comprises three homopolymer subunits linked by covalent bonds (—I—I—I—I—I—O—O—O—O—O—R—R—R—R—R—). The union of the homopolymer subunits may require an intermediate non-repeating subunit, known as a junction block. Block copolymers with two or three distinct blocks are called diblock copolymers and triblock copolymers, respectively.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure may have a weight average molecular weight (Mw) of 15,000 to about 80,000 Daltons [±1,000 Daltons], or of 15,000 to about 35,000 Daltons [±1,000 Daltons], or of about 20,000 to about 30,000 Daltons [±1,000 Daltons]. In certain embodiments, the cross-linkable polycarbonates have weight average molecular weights of about 16,000 Daltons [±1,000 Daltons], about 17,000 Daltons [±1,000 Daltons], about 18,000 Daltons [±1,000 Daltons], about 19,000 Daltons [±1,000 Daltons], about 20,000 Daltons [±1,000 Daltons], about 21,000 Daltons [±1,000 Daltons], about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], or about 35,000 Daltons [±1,000 Daltons]. In additional embodiments, the cross-linkable polycarbonates have a Mw of 17,000 to about 80,000 Daltons. Molecular weight determinations may be performed using gel permeation chromatography (GPC), using a cross-linked styrene-divinylbenzene column and calibrated to polycarbonate references using a UV-VIS detector set at 264 nm, or alternatively using a refractive index detector. Samples may be prepared at a concentration of about 1 mg/ml, and eluted at a flow rate of about 1.0 ml/min.

The cross-linkable polycarbonates of the present disclosure may have a polydispersity index (PDI) of about 2.0 to about 5.0, about 2.0 to about 3.0, or about 2.0 to about 2.5. The PDI is measured prior to any UV exposure.

It is noted that the molecular weight (both weight-average and number-average) of the cross-linkable polycarbonate can be measured using two different kinds of detectors, i.e. an ultraviolet (UV) detector or a refractive index (RI) detector, using GPC and calibrated to polycarbonate standards for both detectors.

In embodiments, the ratio of the polydispersity index (PDI) measured using a UV detector to the PDI measured using an RI detector is 1.4 or less, when using a GPC method and polycarbonate molecular weight standards. The ratio may also be 1.2 or less, or 1.1 or less.

The cross-linkable polycarbonates of the present disclosure may have a melt flow rate (MFR) of 1 to 45 grams/10 min, 6 to 15 grams/10 min, 6 to 8 grams/10 min, 6 to 12 grams/10 min, 2 to 30 grams/10 min, 5 to 30 grams/10 min, 8 to 12 grams/10 min, 8 to 10 grams/10 min, or 20 to 30 grams/10 min, using the ASTM D1238 method, 1.2 kg load, 300° C. temperature, 360 second dwell.

The cross-linkable polycarbonates of the present disclosure may have a biocontent of 2 wt % to 90 wt %; 5 wt % to 25 wt %; 10 wt % to 30 wt %; 15 wt % to 35 wt %; 20 wt % to 40 wt %; 25 wt % to 45 wt %; 30 wt % to 50 wt %; 35 wt % to 55 wt %; 40 wt % to 60 wt %; 45 wt % to 65 wt %; 55 wt % to 70 wt %; 60 wt % to 75 wt %; 50 wt % to 80 wt %; or 50 wt % to 90 wt %. The biocontent may be measured according to ASTM D6866.

The cross-linkable polycarbonates of the present disclosure may have a modulus of elasticity of greater than or equal to ($\geq$) 2200 megapascals (MPa), $\geq$2310 MPa, $\geq$2320 MPa, $\geq$2330 MPa, $\geq$2340 MPa, $\geq$2350 MPa, $\geq$2360 MPa, $\geq$2370 MPa, $\geq$2380 MPa, $\geq$2390 MPa, $\geq$2400 MPa, $\geq$2420 MPa, $\geq$2440 MPa, $\geq$2460 MPa, $\geq$2480 MPa, $\geq$2500 MPa, or $\geq$2520 MPa as measured by ASTM D 790 at 1.3 mm/min, 50 mm span.

In embodiments, the cross-linkable polycarbonates of the present disclosure may have a flexural modulus of 2,200 to 2,500, preferably 2,250 to 2,450, more preferably 2,300 to 2,400 MPa. In other embodiments, the cross-linkable polycarbonates of the present disclosure may have a flexural modulus of 2,300 to 2,600, preferably 2,400 to 2,600, more preferably 2,450 to 2,550 MPa. The flexural modulus is also measured by ASTM D790.

The cross-linkable polycarbonates of the present disclosure may have a tensile strength at break of greater than or equal to ($\geq$) 60 megapascals (MPa), $\geq$61 MPa, $\geq$62 MPa, $\geq$63 MPa, $\geq$64 MPa, $\geq$65 MPa, $\geq$66 MPa, $\geq$67 MPa, $\geq$68 MPa, $\geq$69 MPa, $\geq$70 MPa, $\geq$71 MPa, $\geq$72 MPa, $\geq$73 MPa, $\geq$74 MPa, $\geq$75 MPa as measured by ASTM D 638 Type I at 50 mm/min.

The cross-linkable polycarbonates of the present disclosure may possess a ductility of greater than or equal to ($\geq$) 60%, $\geq$65%, $\geq$70%, $\geq$75%, $\geq$80%, $\geq$85%, $\geq$90%, $\geq$95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D 256-10.

The cross-linkable polycarbonates of the present disclosure may have a notched Izod impact strength (NII) of greater than or equal to ($\geq$) 500 J/m, $\geq$550 J/m, $\geq$600 J/m, $\geq$650 J/m, $\geq$700 J/m, $\geq$750 J/m, $\geq$800 J/m, $\geq$850 J/m, $\geq$900 J/m, $\geq$950 J/m, or $\geq$1000 J/m, measured at 23° C. according to ASTM D 256.

The cross-linkable polycarbonates of the present disclosure may have a heat distortion temperature of greater than or equal to 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D 648 at 1.82 MPa, with 3.2 mm thick unannealed mm bar.

The cross-linkable polycarbonates of the present disclosure may have a percent haze value of less than or equal to ($\leq$) 10.0%, $\leq$8.0%, $\leq$6.0%, $\leq$5.0%, $\leq$4.0%, $\leq$3.0%, $\leq$2.0%, $\leq$1.5%, $\leq$1.0%, or 0.5% as measured at a certain thickness according to ASTM D 1003-07. The polycarbonate haze may be measured at a 2.0, 2.2, 2.4, 2.54, 2.6, 2.8, 3.0, 3.2, 3.4, 3.6, 3.8, or a 4.0 millimeter thickness. The polycarbonate may be measured at a 0.125 inch thickness.

The polycarbonate may have a light transmittance greater than or equal to ($\geq$) 50%, $\geq$60%, $\geq$65%, $\geq$70%, $\geq$75%, $\geq$80%, $\geq$85%, $\geq$90%, $\geq$95%, $\geq$96%, $\geq$97%, $\geq$98%, $\geq$99%, $\geq$99.1%, $\geq$99.2%, $\geq$99.3%, $\geq$99.4%, $\geq$99.5%, $\geq$99.6%, $\geq$99.7%, $\geq$99.8%, or $\geq$99.9%, as measured at certain thicknesses according to ASTM D 1003-07. The polycarbonate transparency may be measured at a 2.0, 2.2, 2.4, 2.6, 2.8, 3.0, 3.2, 3.4, 3.6, 3.8, or a 4.0 millimeter thickness.

In certain embodiments, the cross-linkable polycarbonates of the present disclosure do not include soft block or soft aliphatic segments in the polycarbonate chain. For example, the following aliphatic soft segments that may be excluded from the cross-linkable polycarbonates of the present disclosure include aliphatic polyesters, aliphatic polyethers, aliphatic polythioethers, aliphatic polyacetals, aliphatic polycarbonates, C—C linked polymers and polysiloxanes. The soft segments of aliphatic polyesters, aliphatic polyethers, aliphatic polythioethers, aliphatic polyacetals, aliphatic polycarbonates may be characterized as having number average molecular weight (Mns) of greater than 600 Daltons.

The cross-linkable polycarbonate resins of the present disclosure may have a Fries content of about 1,900 parts per million by weight (ppm) to about 3,100 ppm. The cross-linkable polycarbonate resins of the present disclosure may have a Fries content of less than or equal to (≤) 1,900 ppm, or ≤1,000 ppm, or ≤500 ppm, e.g., 100 ppm to 500 ppm.

The cross-linkable polycarbonate resins of the present disclosure may have an endcapping value (moles of non-OH endgroups/total moles of endgroups*100) of greater than or equal to (≥) 50%, or ≥65%, or ≥80%, or ≥90%.

The cross-linkable polycarbonate resins of the present disclosure may have metal level of: less than or equal to (≤) 38 ppb, specifically, ≤23 ppb of molybdenum; ≤38 ppb, specifically, ≤23 ppb vanadium; ≤38 ppb, specifically, ≤23 ppb chromium; ≤85 ppb, specifically, ≤57 ppb titanium; ≤425 ppb, specifically, ≤284 ppb of niobium; ≤38 ppb, specifically, ≤23 ppb of nickel; ≤12 ppb, specifically, ≤6 ppb zirconium; ≤12 ppb, specifically, ≤6 ppb of iron, or a combination comprising one or more of the foregoing all based on the total weight of the cross-linkable polycarbonate resin.

The photoactive additives of the present disclosure are prepared using a melt polymerization process, which can also be referred to as a melt reaction process, melt condensation polymerization, or a melt polycondensation polymerization. An exemplary process generally involves reacting a benzophenone and dihydroxy chain extender comonomers with a phosgene substitute, such as a carbonate precursor (e.g., diphenyl carbonate), in the molten state while using a transesterification catalyst. The process can be implemented as a batch process or as a continuous process.

The melt polymerization process occurs at an elevated temperature that is higher than the melting temperature of the desired cross-linkable polycarbonate resin. In embodiments, the melt polymerization occurs at an elevated temperature of about 120° C. to about 350° C., including about 140° C. to about 310° C. The melt polymerization also occurs between pressures of about 0.1 millibar to about 920 millibar, or from about 1 millibar to about 170 millibar. As used herein millibar refers to millibar absolute.

The melt polymerization can be performed as a batch in a single reaction tank, or as a continuous process using multiple tanks in series, and the output is then sent to an extruder. There, the benzophenone can be fed into a reaction tank with the other reaction monomers for polymerization, and the cross-linkable polycarbonate resin is extruded, generally in the form of pellets. Generally, the benzophenone can be added as either a solid or as a solution (i.e. dissolved in a solvent, such as dimethylformamide (DMF) which is inert to the polycarbonate).

The batch melt polymerization process can be described as having three stages: (1) a melting stage; (2) an incorporation stage; and (3) a molecular weight building stage. The reaction mixture prior to the melting stage includes the hydroxybenzophenone, at least one dihydroxy chain extender, a diaryl carbonate, and a transesterification catalyst. The hydroxybenzophenone can be added either as a solid or in solution. During the melting stage, the temperature of the reaction mixture is raised gradually and the pressure is maintained at atmospheric pressure. In various embodiments, in each step of the melting stage, the temperature is increased by at least 20° C. The various ingredients "melt" to react and begin forming oligomers. In the incorporation stage, the co-monomer (e.g. the benzophe-none) is built into the polymer. Finally, in the molecular weight building stage, the molecular weight of the polycarbonate resin increases. During this stage, a reduced pressure is used to help remove byproducts and drive the chain-growth reaction forward. This typically occurs within a polymerizer that is designed to provide a large interfacial area to promote the continued removal of byproducts. The resulting cross-linkable polycarbonate resin is thus obtained. The melt polymerization occurs in an inert atmosphere, which can be provided for example by nitrogen or argon gas.

The reaction can be carried out in typical polymerization equipment, such as a continuously stirred reactor (CSTR), plug flow reactor, wire wetting fall polymerizers, free fall polymerizers, horizontal polymerizers, wiped film polymerizers, BANBURY mixers, single or twin screw extruders, or a combination comprising one or more of the foregoing.

When a batch reaction mixture is used, the melt polymerization process occurs by heating the polycarbonate reaction mixture (containing all ingredients including the hydroxybenzophenone) at a reaction temperature and an initial pressure for an initial time period to cause melting. Next, the polycarbonate reaction mixture is agitated at an agitation speed for an agitation time period while maintaining the reaction temperature. The pressure of the polycarbonate reaction mixture is then reduced to a final pressure for a final time period while maintaining the reaction temperature to obtain the cross-linkable polycarbonate, which can be extruded.

In particular batch process embodiments, the reaction temperature is from 250° C. to 350° C., the initial pressure is from 900 to 1100 millibars, and the initial time period is from 15 to 120 minutes. The agitation time period may comprise a first time period at a first agitation speed, and a second time period at a second higher agitation speed. In particular embodiments, the first agitation speed is from 10 to 30 rpm, and the second (higher) agitation speed is from 30 to 50 rpm. The first time period may be from 15 to 120 minutes, and the second time period may be from 15 to 60 minutes. The final pressure may be from 0.1 to 5 millibars, and the final time period may be from 5 to 75 minutes.

Alternatively, a batch melt polymerization process can occur by heating the polycarbonate reaction mixture (containing all ingredients including the hydroxybenzophenone) and reducing the pressure through several steps. The process initially starts at atmospheric pressure (about 1000 millibars) and room temperature (about 23° C.), and arrives at a final temperature of from 250° C. to 350° C. and a final pressure of from 0.1 millibars to 5 millibars. The reaction may be held here for a final time period of from 5 to 75 minutes (min). In various embodiments, in each step of the process, the temperature is increased by at least 20° C. The reaction can be held at each step for a period of 5 minutes to 120 minutes.

In particular embodiments, the melt polymerization occurs in four stages, where the first and second stages can be considered as the incorporation stage and where the third and fourth stages can be considered as the molecular weight building stage. Here, a monomer mixture at a temperature of 120 to 220° C. and, for example, atmospheric pressure is transferred to a first stage. In the first stage, the a first temperature is 100° C. to 260° C., or 110° C. to 200° C., and the pressure is decreased from a starting pressure of atmospheric pressure, or about 1000 millibars, to a first pressure of from about 700 millibars to about 970 millibars. The temperature and pressure are then held for a first time period of from about 5 minutes to about 75 minutes, or in more specific embodiments, from about 5 minutes to about 35 minutes. In the second stage, the temperature is increased from the first temperature to a second temperature of from 200° C. to 280° C., e.g., 200° C. to 250° C. or 230° C. to 280° C., and the pressure is maintained at a second pressure of from about 700 millibars to about 970 millibars. The temperature and pressure are then held for a second time period of from about 5 minutes to about 75 minutes, or in more specific embodiments, from about 5 minutes to about 35 minutes. In the third stage, the temperature is increased from the second temperature to a third temperature of from 220° C. to 300° C. or 240° C. to 350° C., and the pressure is decreased from the second pressure to a third pressure of from about 550 millibars to about 50 millibars. The temperature and pressure are then held for a third time period of from about 5 minutes to about 75 minutes, or in more specific embodiments, from about 10 minutes to about 65 minutes. In the fourth stage, the temperature is increased from the third temperature to a final temperature of from or 240° C. to 350° C. or 280° C. to 350° C., and the pressure is decreased from the third pressure to a final pressure of from about 0.1 millibars to about 10 millibars. The temperature and pressure are then held for a final time period of from about 5 minutes to about 30 minutes, or in more specific embodiments, from about 5 minutes to about 10 minutes.

In other different embodiments, in the first stage, the pressure is decreased from a starting pressure of atmospheric pressure, to a first pressure of greater than or equal to about 100 millibars. In the second stage, the pressure is decreased from the first pressure to a second pressure of from about 15 millibars to about 90 millibars. In the third stage, the pressure is decreased from the second pressure to a third pressure of from about 1 millibar to about 10 millibars. In the fourth stage, the pressure is decreased from the third pressure to a final pressure of less than or equal to about 10 millibars, or less than or equal to about 5 millibars. In the first stage, the temperature is 150° C. to 280° C., or 260 to 260° C. In the second stage, the temperature is increased from the first temperature to a second temperature of 230° C. to 290° C., or 270° C. to 290° C. In the third stage, the temperature is increased from the second temperature to a third temperature of 260° C. to 315° C. or 260° C. to 285° C. In the fourth stage, the temperature is the same as the third temperature or is increased from the third temperature to a final temperature of 260° C. to 315° C., or 260° C. to 285° C. The times in each stage are as described above.

The temperature from one stage to the next can increase. The pressure from one stage to the next can decrease. The weight average molecular weight after the second stage can be less than or equal to 8,000 Daltons.

Figure 5:
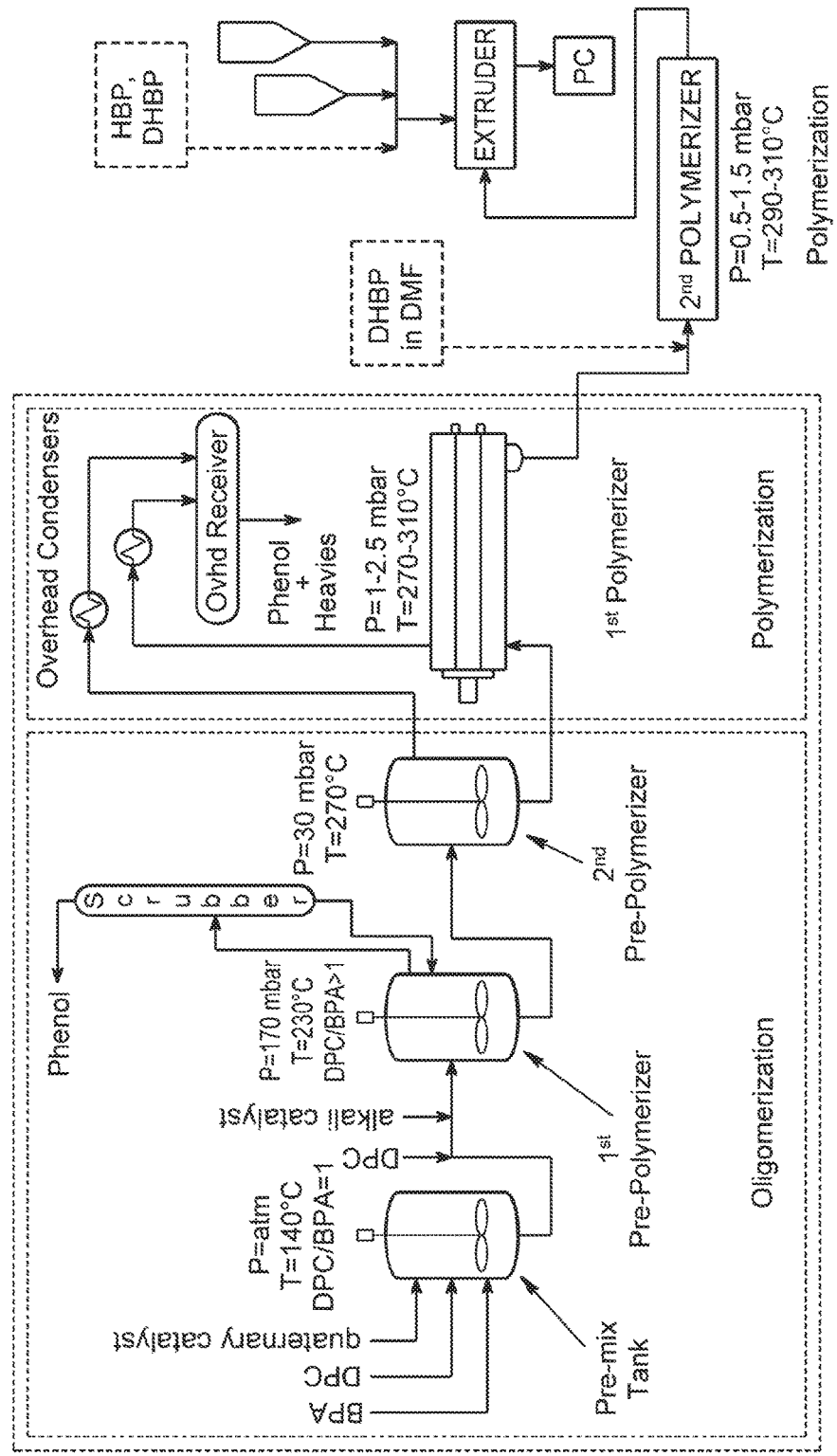
FIG. 5 illustrates a simplified process flow diagram of the melt polymerization process. Briefly, the temperature is stepped up while the pressure is stepped down to oligomerize the dihydroxy chain extender. Next, the oligomers are polymerized. Finally, hydroxybenzophenone endcaps or monomers are added and further polymerization occurs, with the resulting cross-linkable polycarbonate resins then being extruded.

FIG. 5 illustrates a simplified process flow diagram of the continuous melt polymerization process, illustrated with reference to the production of a copolymer of bisphenol-A (BPA) and 4,4'-dihydroxybenzophenone (4,4'-DHBP) having 4-hydroxybenzophenone (4-HBP) endcaps. An alkali catalyst and a quaternary catalyst are used, and diphenyl carbonate (DPC) is used as the carbonate precursor.

The system here includes three mixing tanks in series: a pre-mix tank, a first pre-polymerizer, and a second pre-polymerizer. The dihydroxy chain extender (BPA), carbonate precursor (DPC), and quaternary catalyst form an initial mixture and are reacted in the pre-mix tank. This initial mixture may be considered a polycarbonate reaction mixture. The pre-mix tank operates at a first pressure and a first temperature. In particular embodiments, the first pressure is from 900 to 1100 millibars (i.e. around atmospheric pressure), and the first temperature is from 110° C. to 190° C.

The pre-mix tank feeds into the first pre-polymerizer. Additional carbonate precursor is co-added with the alkali catalyst to the initial mixture. The pressure is reduced from the first pressure to a second pressure, and the temperature is increased from the first temperature to a second temperature, and the first pre-polymerizer is maintained at the second pressure and second temperature. In particular embodiments, the second pressure is from 150 to 190 millibars, and the second temperature is from 200° C. to 260° C.

The first pre-polymerizer feeds into the second pre-polymerizer. There, the pressure is further decreased from the second pressure to a third pressure, and the temperature is further increased from the second temperature to a third temperature, and the second pre-polymerizer is maintained at the third pressure and third temperature. In particular embodiments, the third pressure is from 10 to 50 millibars, and the third temperature is from 240° C. to 300° C. Again, note the third temperature is greater than the second temperature. During this pre-polymerization, phenol is removed, as indicated by the scrubber.

The second-pre-polymerizer feeds into the first polymerizer. There, the initial mixture is polymerized. The polymerization occurs at a fourth temperature higher than the third temperature and a fourth pressure lower than the third pressure to obtain a polycarbonate resin. The first polymerizer is maintained at the fourth pressure and fourth temperature. In particular embodiments, the fourth pressure is from 0.5 to 5 millibars, and the fourth temperature is from 270° C. to 310° C.

The hydroxybenzophenone is then combined with the polycarbonate resin (made from the polycarbonate reaction mixture) from the first polymerizer, and polymerized in a second polymerizer to obtain the cross-linkable polycarbonate resin. As illustrated here, a benzophenone solution is fed into the second polymerizer. The output of the second polymerizer goes to an extruder, where solid benzophenone is fed, and the cross-linkable polycarbonate resin is extruded, generally in the form of pellets. Generally, the benzophenone can be added as either a solid or as a solution (i.e. dissolved in a solvent, such as dimethylformamide (DMF) which is inert to the polycarbonate).

The polymerization in the second polymerizer occurs at a fifth pressure and a fifth temperature, which may vary within the same ranges as the fourth pressure and fourth temperature. The second polymerizer is maintained at the fifth pressure and fifth temperature. In particular embodiments, the fifth temperature is higher than the fourth temperature and the fifth pressure is lower than the fourth pressure. In more specific embodiments, the fifth pressure is from 0.5 to 4 millibars, and the fifth temperature is from 280° C. to 310° C. The polycarbonate resin is subsequently isolated, for example by extrusion.

A quenching agent may optionally be added to the polycarbonate resin. For example, the quenching agent can be added to the polycarbonate resin after a final polymerization (e.g., after a point where the Mw of the polycarbonate resin will increase by less than or equal a 10%), and optionally, before any melt filtering. The quenching agent is used to neutralize or weaken any alkali metal compounds or alkaline earth metal compounds contained in the transesterification catalyst. The quenching agent can minimize or prevent reactions that can occur between an additive and the polymer backbone in the presence of the active catalyst. The quenching agents may comprise one or both of Lewis acid compounds, Bronsted acid compounds or esters of strong acids containing a sulfur atom that neutralize alkaline compounds (e.g. compounds used as the catalysts). Preferably, the Bronsted acid compounds have a pKa of not more than 5, preferably not more than 3 as measured in an aqueous solution thereof at 25° C. Acid compounds exhibiting such values are advantageous.

The quenching agent can be added in solid or liquid form. The quenching agent can be added to the polycarbonate resin (e.g., after a final polymerization) at a pressure of greater than or equal to 2 bars and mixed with the polycarbonate resin for a period of time of greater than or equal to 5 seconds prior to the addition thereto of any additives having a reactive OH group or reactive ester group. As used herein, when referring to "reactive" or a "reactive group", e.g., having a reactive OH group or a reactive ester group, the reactivity is with respect to polycarbonate.

Concrete examples of useful Lewis acid compounds include boron compounds such as $B(OPh)_3$, zinc borate and boron phosphate; boric acid esters such as $B(OCH_3)_3$, $B(OEt)_3$ and $B(OPh)_3$; aluminum compounds such as aluminum stearate and aluminum silicate; zirconium compounds such as zirconium carbonate, zirconium alkoxide and zirconium hydroxycarboxylate; gallium compounds such as gallium phosphide and gallium antimonide; germanium compounds such as germanium oxide and organogermanium compounds; tin compounds such as tetra- and hexaorganotin; antimony compounds such as $Sb_2O_3$, antimony oxide and alkylantimony; bismuth compounds such as bismuth oxide and alkylbismuth; zinc compounds such as $(CH_3COO)_2Zn$ and zinc stearate; and titanium compounds such as alkoxytitanium and titanium oxide. In the above-mentioned formulas, Ph represents a phenyl group, Et represents an ethyl group, and Bu represents a butyl group.

Concrete examples of useful Bronsted acid compounds include phosphoric acid, phosphorous acid, hypophosphorous acid, pyrophosphoric acid, poly-phosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicyclic acid, nicotic acid, fumaric acid, maleic acid, oxalic acid, benzene-sulfinic acid, toluenesulfinic acid, and sulfonic acids such as benzenesulfonic acid, p-toluenesulfonic acid, trifluoromethane sulfonic acid, napthalene sulfonic acid, sulfonated polystyrene, and methyl acrylate-sulfonated styrene copolymer.

Concrete examples of useful ester of strong acids containing a sulfur atom include compounds comprising an acid residue having pKa of not more than 3 such as dimethyl sulfonate, diethyl sulfonate, methyl, ethyl, butyl, octyl or phenyl ester of p-toluenesulfonic acid, and methyl, ethyl, butyl, octyl or phenyl ester of benzenesulfonic acid.

Of these acid compounds as exemplified above, preferred are those having sulfur atom or phosphorous atom, particularly those containing sulfur atom. These acid compounds may be used either singly or in combination. However, in some specific variations, no quenching agent is used.

The polymeric compositions/blends of the present disclosure can also include a polymeric base resin that is different from the photoactive additive, i.e. a second polymer resin. More specifically, the second polymer resin does not contain photoactive groups. In embodiments, the weight ratio of the cross-linkable polycarbonate resin (A) to the polymeric base resin (B) is from 1:99 to 99:1, including from about 50:50 to about 95:5, or from about 10:90 to about 15:85, or from about 25:75 to about 50:50. The polymeric base resin has, in specific embodiments, a weight-average molecular weight of about 17,000 or greater, including from about 21,000 to about 40,000.

The second polymer (Polymer B) may be any polymer different from the first polymer that is suitable for use in a blend composition. In certain embodiments, the second polymer may be a polyester, a polyestercarbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In certain embodiments, the polymeric base resin may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In yet other embodiments, the polymer resin in the blend is selected from the group consisting of a polycarbonate-polysiloxane copolymer; a polycarbonate resin having an aliphatic chain containing at least two carbon atoms as a repeating unit in the polymer backbone; a copolyester polymer; a bisphenol-A homopolycarbonate; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; a dimethyl bisphenol cyclohexane-co-bisphenol-A copolymer; a polyetherimide; a polyethersulfone; and a copolycarbonate of bisphenol-A and 1,1-bis(4-hydroxyphenyl)-3,3,5-trimethylcyclohexane) (BPTMC).

Other conventional additives can also be added to the polymeric composition (e.g. an impact modifier, UV stabilizer, flame retardant, heat stabilizer, plasticizer, lubricant, mold release agent, filler, reinforcing agent, antioxidant agent, antistatic agent, blowing agent, or radiation stabilizer).

In preferred embodiments, the blend compositions disclosed herein comprise a flame-retardant, a flame retardant additive, and/or an impact modifier. The flame-retardant may be potassium perfluorobutane sulfonate (Rimar salt), potassium diphenyl sulfone-3-sulfonate (KSS), or a combination thereof.

Various types of flame retardants can be utilized as additives. This includes flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like. Rimar salt and KSS and NATS, alone or in combination with other flame retardants, are particularly useful in the compositions disclosed herein. In certain embodiments, the flame retardant does not contain bromine or chlorine, i.e. is non-halogenated. Another useful class of flame retardant is the class of cyclic siloxanes having the general formula $[(R)_2SiO]_y$ wherein R is a monovalent hydrocarbon or fluorinated hydrocarbon having from 1 to 18 carbon atoms and y is a number from 3 to 12. A particularly useful cyclic siloxane is octaphenylcyclotetrasiloxane.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate; phosphates such as trimethyl phosphate; and combinations thereof.

Mold release agent (MRA) will allow the material to be removed quickly and effectively, and can reduce cycle times, defects, and browning of finished product. Exemplary MRAs include phthalic acid esters; di- or polyfunctional aromatic phosphates such as resorcinol tetraphenyl diphosphate (RDP), the bis(diphenyl) phosphate of hydroquinone and the bis(diphenyl) phosphate of bisphenol-A; pentaerythritol tetrastearate (PETS), and the like.

In other particular embodiments, the polymeric blend/composition includes the cross-linkable polycarbonate resin, an optional polymeric base resin, a flame retardant; a heat stabilizer, and a mold release agent.

The additives, when used, can improve various properties of the final article. Increased chemical resistance may be found against 409 Glass and Surface Cleaner; Alcohol Prep Pad; CaviCide liquid/CaviWipes; CaviWipes; Cidex Plus liquid; Clorox Bleach; Clorox Wipes; Envirocide liquid; ForPro liquid; Gentle dish soap and water; Hydrogen Peroxide Cleaner Disinfectant Wipes; Isopropyl Alcohol wipes; MadaCide-1 liquid; Mar-V-Cide liquid to dilute; Sani-Cloth Bleach Wipes; Sani-Cloth HB Wipes; Sani-Cloth Plus Wipes; Sodium Hypochlorite liquid; Super Sani-Cloth Wipes; Viraguard liquid and Wipes; Virex 256; Windex Blue; Fuel C; Toluene; Heptane; Ethanol; Isopropanol; Windex; Engine oil; WD40; Transmission fluid; Break fluid; Glass wash; Diesel; Gasoline; Banana Boat Sunscreen (SPF 30); Sebum; Ivory Dish Soap; SC Johnson Fantastik Cleaner; French's Yellow Mustard; Coca-Cola; 70% Isopropyl Alcohol; Extra Virgin Olive Oil; Vaseline Intensive Care Hand Lotion; Heinz Ketchup; Kraft Mayonnaise; Chlorox Formula 409 Cleaner; SC Johnson Windex Cleaner with Ammonia; Acetone; Artificial Sweat; Fruits & Passion Cucina Coriander & Olive Hand Cream; Loreal Studioline Megagel Hair Gel; Maybelline Lip Polish; Maybelline Expert Wear Blush—Beach Plum Rouge; Purell Hand Sanitizer; Hot coffee, black; iKlear; Chlorox Wipes; Squalene; Palmitic Acid; Oleic Acid; Palmitoleic Acid; Stearic Acid; and Olive Oil.

The compositions/blends can be molded into useful shaped articles by a variety of means such as injection molding, overmolding, co-injection molding, extrusion, multilayer extrusion, rotational molding, blow molding and thermoforming to form articles. This includes thin-walled articles, including highly transparent thin-walled articles. The formed articles may be subsequently subjected to cross-linking conditions (e.g., UV-radiation) to affect cross-linking of the polycarbonates. Exemplary articles include a film, a sheet, a layer of a multilayer film, or a layer of a multilayer sheet.

Articles that may be formed from the compositions/blends include an automotive exterior component (such as an automotive bumper, an automobile mirror housing, an automobile grille, an automobile pillar, an automobile exterior light, an automobile door hardware, and an automobile wheel cover), an automotive interior component (such as an automobile instrument panel or trim, an automobile glove box, an automobile door hardware, and an interior trim), and an automobile part within the engine compartment. Articles include a construction or agricultural equipment grille, Articles include an agricultural tractor or device part, a construction equipment vehicle or device part, a marine or personal water craft part, an all-terrain vehicle or all-terrain vehicle part. Articles include plumbing equipment, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, a hand held electronic device enclosure or part, a walkie-talkie enclosure or part, a scanner enclosure or part, a media/MP3/MP4 player enclosure or part, a radio enclosure or part, a GPS system enclosure or part, an ebook enclosure or part, a tablet enclosure or part, a wearable electronic device, a smart watch, a wearable training/tracking device, a wearable activity/sleep monitoring system, a wearable electronic wristband, electronic glasses, a hand held tool enclosure or part, a smart phone enclosure or part, and a turbine blade. Articles include a valve or pump.

In certain embodiments, the article is one that requires hydrothermal stability, such as a wind turbine blade, a steam sterilizable medical device, a food service tray, utensils and equipment.

In certain embodiments, the article is one that requires a combination of transparency, flame resistance, and/or impact resistance. For example, in certain embodiments the article may be a safety shield, safety goggles, a gas/fuel pump housing, a display window or part, or the like.

After forming the article, the article can then be exposed to ultraviolet (UV) light at an appropriate wavelength and dosage to bring about the desired amount of crosslinking for the given application. The UV exposure can be performed on one or more surfaces of the article.

The article should be exposed with a substantially uniform dose of UV light. The exposure can be accomplished using standard methods. The UV light can come from any source of UV light such as mercury vapor, High-Intensity Discharge (HID), or various UV lamps. The exposure time can range from a few minutes to several days. Examples of UV-emitting light bulbs include mercury bulbs (H bulbs), or metal halide doped mercury bulbs (D bulbs, H+ bulbs, and V bulbs). Other combinations of metal halides to create a UV light source are also contemplated. A mercury arc lamp is not used for irradiation. An H bulb has an output in the range of 200 nm to 320 nm. The D bulb has an output in the 320 nm to 400 nm range. The V bulb has output in the 400 nm to 420 nm range. It may also be advantageous to use a UV light source where the harmful wavelengths are removed or not present, for example, by using filters.

It may also be advantageous to use a UV light source where the harmful wavelengths (those that cause polymer degradation or excessive yellowing) are removed or not present. Equipment suppliers such as Heraeus Noblelight and Fusion UV provide lamps with various spectral distributions. The light can also be filtered to remove harmful or unwanted wavelengths of light. This can be done with optical filters that are used to selectively transmit or reject a wavelength or range of wavelengths. These filters are commercially available from a variety of companies such as Edmund Optics or Praezisions Glas & Optik GmbH. Bandpass filters are designed to transmit a portion of the spectrum, while rejecting all other wavelengths. Longpass edge filters are designed to transmit wavelengths greater than the cut-on wavelength of the filter. Shortpass edge filters are used to transmit wavelengths shorter than the cut-off wavelength of the filter. Various types of materials, such as borosilicate glass, can be used as a long pass filter. Schott and/or Praezisions Glas & Optik GmbH for example have the following long pass filters: WG225, WG280, WG295, WG305, WG320 which have cut-on wavelengths of ~225, 280, 295, 305, and 320 nm, respectively. These filters can be used to screen out the harmful short wavelengths while transmitting the appropriate wavelengths for the crosslinking reaction.

UV wavelengths can be separated into four different categories. UVA refers to wavelengths from 320 nm to 390 nm. UVB refers to wavelengths from 280 nm to 320 nm. UVC refers to wavelengths from 250 nm to 260 nm. UVV refers to wavelengths from 395 nm to 445 nm. These wavelengths of light were measured with an EIT Power-Puck, and the categories are defined by the manufacturer (EIT Inc., Sterling, Va.).

In some embodiments, the UV radiation is filtered to provide exposure to UVA radiation with no detectable UVC radiation, as measured using an EIT PowerPuck. The effective dosage can range from at least 1 J/cm$^2$ of UVA radiation up to about 60 J/cm$^2$ of UVA radiation. In more specific embodiments, the UV radiation is filtered to provide an effective dosage at least 2 J/cm$^2$, or at least 3 J/cm$^2$, or at least 12 J/cm$^2$, or at least 21 J/cm$^2$, or at least 36 J/cm$^2$ of UVA radiation, with no detectable UVC radiation, as measured using an EIT PowerPuck. In particular embodiments, the polycarbonate fibers are exposed to a dosage of about 21 J/cm$^2$ to about 60 J/cm$^2$ of UVA radiation, or in more particular embodiments a dosage of about 21 J/cm$^2$ to about 36 J/cm$^2$ of UVA radiation.

The following examples are provided to illustrate the processes, the resulting polycarbonate resins, and the properties of the present disclosure. The examples are merely illustrative and are not intended to limit the disclosure to the materials, conditions, or process parameters set forth therein.

EXAMPLES

Benzophenones were polymerized with bisphenol-A to form polycarbonate resins containing benzophenone monomers and/or endcaps.

The total amount of benzophenone, including the amounts incorporated into the polycarbonate resin or present in residual amounts after reaction, was measured through high-performance liquid chromatography by methanolysis of the benzophenone-containing carbonate linkages and by detecting the benzophenone at a wavelength of 310 nm. In the examples, 0.3 grams of the resin was dissolved in 5 mL of tetrahydrofuran (THF), and then 2.6 mL of a potassium hydroxide/methanol solution was added. The mixture was stirred for 40 minutes at 35° C. 1.4 mL of glacial acetic acid was added for base neutralization, and 1 mL of a solution of 500 ppm p-terphenyl in THF was added as an internal standard. The resulting solution was filtered using a 0.2 micrometer filter and tested by HPLC. The benzophenone content was reported in parts per million (ppm). This method was also used to quantify the Fries content of the resins.

The residual amount of benzophenone was measured by HPLC. 0.5 grams of the polycarbonate rein was dissolved in 5 mL of dichloromethane, then adding 10 mL of methanol in order to precipitate the polycarbonate. This transferred all residual benzophenone to the methanol solution. The methanol solution was filtered and used for HPLC measurement. To express the efficiency of the melt polymerization reaction for incorporating benzophenones into the cross-linkable polycarbonate resin, the percent incorporation of benzophenone was calculated using the formula:

$$\% \text{ Incorporation} = \frac{\text{amount of incorporated benzophenone}}{\text{amount of added benzopohenone}} \times 100$$

Weight-average molecular weight and number-average molecular weight were measured by gel permeation chromatography analysis of 1 mg/mL cross-linkable polycarbonate solution in dichloromethane versus polystyrene standards.

Polymerizations of benzophenone with a polycarbonate were carried out in a lab scale batch polymerizer, which consisted of a glass tube reactor (3.8 by 30 centimeters) connected to a vacuum system and equipped with an agitator and a heating jacket. The bottom of the reactor had a breakaway glass nipple for removal of the final polymer in molten phase. To avoid the presence of any sodium from glass (which can have a catalytic effect), the reactor was pre-treated with 3M HCl solution for at least 12 hours and thoroughly rinsed in deionized water before using for polymerization.

The benzophenones were incorporated into an unquenched bisphenol-A polycarbonate resin without any additives. "Unquenched resin" as used herein refers to a polycarbonate with active and not neutralized catalyst system of NaKHPO$_4$ (0.7×10$^{-6}$ mole/mole BPA) and tetrabutyl phosphonium acetate (50×10$^{-6}$ mole/mole BPA). The unquenched resin had a Mw=56,248 Daltons; Mn=21,671 Daltons; PDI=2.60; and Fries content of 1975 ppm. The polycarbonate resin was used in all of the examples below.

Example 1

A batch reactor tube was charged with the polycarbonate resin (PC) and 4-hydroxybenzophenone (HBP) in the amounts shown in Table 1. The reactor was assembled, evacuated, and refilled with nitrogen gas three times. The reaction mixture was heated to a temperature of 300° C. and maintained at this temperature for 10 minutes in order to allow the mixture to melt while the pressure in the reaction vessel was kept at atmospheric pressure. When the reactor content was fully melted, the mixture was agitated at 20 rpm for 10 minutes. After 10 minutes, the agitation was raised to 40 rpm for 20 minutes. After 20 minutes, the pressure was reduced to 1 millibar, while the temperature was kept at 300° C. The mixture was held at these conditions for 60 minutes. Then, the reactor was vented to atmospheric pressure with nitrogen gas, the glass nipple on the reaction vessel bottom was broken, and the mixture was extruded from the reactor. 14 different examples were prepared. The resulting cross-linkable polycarbonates are shown in Table 2.

TABLE 1

PC and HBP loadings

| Reaction | wt % HBP | PC (g) | HBP (g) | HBP$_{added}$ (ppm) |
|---|---|---|---|---|
| HBP1 | 1 | 29.70 | 0.300 | 10013 |
| HBP2 | 1 | 29.70 | 0.304 | 10118 |
| HBP3 | 1 | 29.72 | 0.308 | 10263 |
| HBP4 | 2 | 29.40 | 0.605 | 20149 |
| HBP5 | 2 | 29.40 | 0.603 | 20084 |
| HBP6 | 2 | 29.40 | 0.603 | 20098 |
| HBP7 | 3 | 29.11 | 0.901 | 30033 |
| HBP8 | 3 | 29.11 | 0.907 | 30214 |
| HBP9 | 3 | 29.11 | 0.904 | 30133 |
| HBP10 | 4 | 28.80 | 1.201 | 40024 |
| HBP11 | 4 | 28.81 | 1.203 | 40092 |
| HBP12 | 4 | 28.80 | 1.201 | 40027 |
| HBP13 | 5 | 28.50 | 1.500 | 50009 |
| HBP14 | 5 | 28.50 | 1.499 | 49957 |

TABLE 2

Properties of HBP Polycarbonate Resins

| Reaction | Mw | Mn | PDI | Fries (ppm) | HBP$_{Total}$ (ppm) | HBP$_{Residual}$ (ppm) | % incorporation of HBP |
|---|---|---|---|---|---|---|---|
| HBP1 | 43110 | 14882 | 2.90 | 2201 | 7043 | 288 | 67.5 |
| HBP2 | 41786 | 14505 | 2.88 | 2067 | 6621 | 307 | 62.4 |
| HBP3 | 42539 | 14242 | 2.99 | 2116 | 7346 | 258 | 69.1 |
| HBP4 | 33022 | 11535 | 2.86 | 2183 | 12844 | 563 | 61.0 |
| HBP5 | 33337 | 11603 | 2.87 | 2180 | 12224 | 559 | 58.1 |
| HBP6 | 33137 | 11597 | 2.86 | 2213 | 12472 | 548 | 59.3 |
| HBP7 | 26153 | 9381 | 2.79 | 2470 | 16903 | 1011 | 52.9 |
| HBP8 | 23470 | 8630 | 2.72 | 2344 | 19211 | 1298 | 59.3 |
| HBP9 | 27779 | 9819 | 2.83 | 2292 | 16650 | 875 | 52.4 |
| HBP10 | 26081 | 9335 | 2.79 | 2307 | 20243 | 1048 | 48.0 |
| HBP11 | 21980 | 8142 | 2.70 | 2438 | 23629 | 1438 | 55.4 |
| HBP12 | 23561 | 8550 | 2.76 | 2232 | 21504 | 1193 | 50.7 |
| HBP13 | 22267 | 8131 | 2.74 | 2826 | 23849 | 1435 | 44.8 |
| HBP14 | 19834 | 7463 | 2.66 | 2343 | 26314 | 2343 | 48.8 |

Example 2

A batch reactor tube was charged with the polycarbonate resin (PC) and 4,4'-dihydroxybenzophenone (DHBP) in the amounts shown in Table 3. 15 different examples were prepared as described above in Example 1. The resulting cross-linkable polycarbonates are shown in Table 4.

TABLE 3

PC and DHBP loadings

| Reaction | % DHBP | PC (g) | DHBP (g) | DHBP$_{added}$ (ppm) |
|---|---|---|---|---|
| DHBP1 | 1 | 29.70 | 0.301 | 10020 |
| DHBP2 | 1 | 29.70 | 0.301 | 10026 |
| DHBP3 | 1 | 29.70 | 0.303 | 10085 |
| DHBP4 | 2 | 29.41 | 0.602 | 20059 |
| DHBP5 | 2 | 29.40 | 0.606 | 20200 |
| DHBP6 | 2 | 29.41 | 0.603 | 20082 |
| DHBP7 | 3 | 29.10 | 0.902 | 30078 |
| DHBP8 | 3 | 29.11 | 0.900 | 29994 |
| DHBP9 | 3 | 29.11 | 0.905 | 30162 |
| DHBP10 | 4 | 28.80 | 1.203 | 40093 |
| DHBP11 | 4 | 28.81 | 1.205 | 40130 |
| DHBP12 | 4 | 28.82 | 1.207 | 40204 |
| DHBP13 | 5 | 28.50 | 1.500 | 49987 |
| DHBP14 | 5 | 28.50 | 1.499 | 49973 |
| DHBP15 | 5 | 28.50 | 1.503 | 50090 |

Example 3

Three samples were produced by adding the benzophenone to melt polymerization in a pilot plant. The pilot plant had the setup shown in FIG. 5. A catalyst system comprising the inorganic catalyst NaKHPO$_4$ (0.7×10$^{-6}$ mole/mole BPA) and the organic catalyst TBPA (50×10$^{-6}$ mole/mole BPA) was used to produce a polycarbonate resin from diphenyl carbonate and bisphenol-A (BPA). The molar ratio of diphenyl carbonate to bisphenol-A was 1.036. In order to not generate excessive undesirable byproducts due to the large reactor volumes and residence times, benzophenone was added at two addition points at the final stages of the process.

The extruder's barrels and die-head had a temperature of 295 degrees Celsius, and the extruder speed was 100 rpm. The output was 42 kilograms/hour. The second polymerizer was operated at 302° C., 1 millibar pressure, and agitation of 12 rpm.

Sample 1

Sample 1 was produced by adding 4,4'-DHBP to the second polymerizer as a 40 wt % solution in dimethyformamide.

Sample 2

Sample 2 was produced by adding 4,4'-DHBP as a solid in the extruder.

Sample 3

Sample 3 was produced by adding 4-HBP as a solid in the extruder.

TABLE 4

Properties of DHBP Polycarbonate Resins

| Reaction | Mw | Mn | PDI | Fries (ppm) | DHBP$_{Total}$ (ppm) | DHBP$_{Residual}$ (ppm) | % incorporation of DHBP |
|---|---|---|---|---|---|---|---|
| DHBP1 | 50721 | 18975 | 2.67 | 2161 | 9631 | 19 | 95.9 |
| DHBP2 | 52871 | 19640 | 2.69 | 2120 | 9802 | 17 | 97.6 |
| DHBP3 | 49585 | 18949 | 2.62 | 2119 | 9805 | 23 | 97.0 |
| DHBP4 | 35222 | 14234 | 2.48 | 2163 | 19294 | 114 | 95.6 |
| DHBP5 | 36485 | 14621 | 2.50 | 2206 | 19824 | 105 | 97.6 |
| DHBP6 | 34758 | 14270 | 2.44 | 2094 | 19732 | 114 | 97.7 |
| DHBP7 | 27805 | 11918 | 2.33 | 2222 | 30148 | 435 | 98.8 |
| DHBP8 | 26521 | 11347 | 2.34 | 2075 | 28688 | 288 | 94.7 |
| DHBP9 | 26731 | 11412 | 2.34 | 2146 | 28766 | 277 | 94.5 |
| DHBP10 | 22897 | 9969 | 2.30 | 2193 | 38177 | 492 | 94.0 |
| DHBP11 | 21481 | 9501 | 2.26 | 2123 | 38463 | 560 | 94.5 |
| DHBP12 | 22563 | 9877 | 2.28 | 2101 | 37988 | 508 | 93.2 |
| DHBP13 | 17520 | 8010 | 2.19 | 2309 | 48665 | 911 | 95.5 |
| DHBP14 | 16526 | 7600 | 2.17 | 2196 | 49704 | 1064 | 97.3 |
| DHBP15 | 17764 | 8096 | 2.19 | 2221 | 48746 | 1298 | 94.7 |

The results are shown in Table 5. The total benzophenone (BP) content and residual benzophenone content is listed as well.

TABLE 5

| Sample | Mw | Mn | PDI | Fries (ppm) | BP$_{Total}$ (ppm) | BP$_{Residual}$ (ppm) | % incorporation |
|---|---|---|---|---|---|---|---|
| 1 | 34172 | 15108 | 2.26 | 796 | 10162 | 49 | 67.4 |
| 2 | 30885 | 13743 | 2.24 | 1751 | 12921 | 77 | 85.6 |
| 3 | 28297 | 28297 | 2.68 | 3068 | 11764 | 620 | 74.3 |

Example 4

Samples of various dimensions were made from a cross-linkable polycarbonate (XPC) copolymer containing bisphenol-A and 1.6 mole % 4,4'-dihydroxybenzophenone (DHBP), and p-cumylphenol (PCP) endcaps. Several properties were then tested. The flame performance of these plaques was tested before and after UV exposure to 30 J/cm$^2$ UVA using unfiltered UV light from a Fusion UV system. Chemical resistance was measured by the elongation at break of tensile bars having 3.2 mm thickness. For flame performance, results for 48 hours are reported on the left column, while results for 168 hours are reported on the right column for each example.

Molecular weight determinations were performed using gel permeation chromatography (GPC), using a cross-linked styrene-divinylbenzene column and calibrated to polycarbonate references using a UV-VIS detector set at 264 nanometer (nm). Samples were prepared at a concentration of about 1 milligram per milliliter (mg/ml), and eluted at a flow rate of about 1.0 milliliter per minute (ml/min). Optionally, a refractive index (RI) detector can be used.

Flammability tests were performed following the procedure of Underwriter's Laboratory Bulletin 94 entitled "Tests for Flammability of Plastic Materials, UL94". Several ratings can be applied based on the rate of burning, time to extinguish, ability to resist dripping, and whether or not drips are burning. According to this procedure, materials may be classified as HB, V0, V1, V2, 5V, 5 VA and/or 5 VB on the basis of the test results obtained for five samples. The criteria for the flammability classifications or "flame retardance" are described below.

V0: A specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

To achieve a V0 rating, specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame 5 VA: Testing is done on both bar and plaque specimens. Procedure for Bars: A bar specimen is supported in a vertical position and a flame is applied to one of the lower corners of the specimen at a 20° angle. The flame is applied for 5 seconds and is removed for 5 seconds. The flame application and removal is repeated five times. Procedure for Plaques: The procedure for plaques is the same as for bars except that the plaque specimen is mounted horizontally and a flame is applied to the center of the lower surface of the plaque.

To achieve a 5 VA rating, specimens must not have any flaming or glowing combustion for more than 60 seconds after the five flame applications. Specimens must not drip flaming particles that ignite the cotton. Plaque specimens must not exhibit burnthrough (a hole).

Flammability testing was conducted using the standard Underwriters Laboratory UL 94 test method (2 day or 7 day conditioning), except that 20 bars rather than the usual 5 bars were tested. Specimens are to be preconditioned either at room temperature for 48 hours or in an air-circulating oven for 168 hours at 70±1° C. and then cooled in a desiccator for at least 4 hours at room temperature, prior to testing. Once removed from the desiccator, specimens are tested within 30 minutes.

The data was analyzed by calculation of the average flame out time, standard deviation of the flame out time and the total number of drips. Statistical methods were used to convert the data to a probability that a specific formulation would achieve a first time V0 pass or "p(FTP)" in the standard UL 94 testing of 5 bars. The probability of a first time pass on a first submission (pFTP) may be determined according to the formula:

$$\text{pFTP} = (P_{t1>mbt,n=0} \times P_{t2>mbt,n=0} \times P_{total<=mtbt} \times P_{drip,n=0})$$

where $P_{t1>mbt,n=0}$ is the probability that no first burn time exceeds a maximum burn time value, $P_{t2>mbt,n=0}$ is the probability that no second burn time exceeds a maximum burn time value, $P_{total<=mtbt}$ is the probability that the sum of the burn times is ≤ a maximum total burn time value, and $P_{drip,n=0}$ is the probability that no specimen exhibits dripping during the flame test. First and second burn time refer to burn times after a first and second application of the flame, respectively.

The probability that no first burn time exceeds a maximum burn time value, $P_{t1>mbt,n=0}$, may be determined from the formula: $P_{t1>mbt,n=0} = (1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt,n=0} = (1-P_{t2>mbt})^5$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip,n=0}$ that no specimen exhibits dripping during the flame test is an attribute function, estimated by: $(1-P_{drip})^5$ where $P_{drip}$=(the number of bars that drip/the number of bars tested).

The probability $P_{total<=mtbt}$ that the sum of the burn times ≤ is a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL94 V0 rating, the maximum total burn time is 50 seconds. For a V1 rating, the maximum total burn time is 250 seconds.

Preferably p(FTP) values will be 1 or very close to 1 for high confidence that a sample formulation would achieve a V0 rating in UL 94 testing.

Cross-linked polycarbonate samples were evaluated for chemical resistance under strain conditions. A tensile bar was positioned in a strain jig, so that the curvature of the jig induced a 0.5% or 1% stress level on the tensile bar. A portion of the bar was exposed to a solvent by dripping the solvent on top of the tensile bars. The bar was then allowed to sit on the jig for 24 hours, during which time the solvent evaporated. The % elongation at break was then reported. The solvent was acetone, or a naphthalene/toluene mixture (Naph/Tol).

The Yellowness Index (YI) was measured on 3.2 mm tensile bars before UV exposure and at least 48 hours after UV exposure using an X-Rite Color i7 benchtop spectrophotometer in the transmission mode using CIELAB color equation, an observer angle of 2 degrees, and illuminant C as the light source. YI was measured following ASTM E313-73 (D1925).

The MFR for each sample was calculated using the ASTM D1238 method, 1.2 kg load, 300° C. temperature, 360 second dwell. The results are shown in Table 6.

TABLE 6

| Components | AF090913-3 |
|---|---|
| DHBP LF XPC (1.6 mole %) (phr) | 100 |
| Rimar Salt (phr) | 0.1 |
| Phosphite stabilizer (phr) | 0.06 |
| MFR (1.2 kg/300° C., 360 sec) | 6.15 |
| MFR (1.2 kg/300° C., 1080 sec) | 6.39 |
| Gel Thickness (micrometer) | 9.75 |
| Delta YI | 20.1 |
| Flame Performance (non-UV exposure) | |
| p(FTP) for V0 @ 1.5 mm (48 hr/168 hr) | 0.823   0 |
| flaming drips | 0/3   3/3 |
| p(FTP) for V0 @ 1.2 mm (48 hr/168 hr) | 0   0 |
| flaming drips | 3/3   3/3 |
| p(FTP) for V0 @ 1.0 mm (48 hr/168 hr) | 0   0 |
| flaming drips | 3/3   3/3 |
| 5 VA @ 1.5 mm (48 hr/168 hr) | Fail   Fail |
| Flame Performance (UV exposure) | |
| p(FTP) for V0 @ 1.5 mm (48 hr/168 hr) | 0.99   0.769 |
| flaming drips | 0/18   0/18 |
| p(FTP) for V0 @ 1.2 mm (48 hr/168 hr) | 0.982   0.977 |
| flaming drips | 0/18   0/18 |
| p(FTP) for V0 @ 1.0 mm (48 hr/168 hr) | 0.987   0.43 |
| flaming drips | 0/18   0/18 |
| 5 VA @ 1.5 mm | Pass   Fail |
| Chemical Resistance (Elongation @ Break) | |
| As molded bar | 119.9 |
| Acetone @ 0.5% strain | |
| No UV | 1.5 |
| Exposed to UV | 97.0 |
| Acetone @ 1% strain | |
| No UV | 0.0 |
| Exposed to UV | 78.2 |
| Naph/Tol @ 0.5% strain | |
| No UV | 97.8 |
| Exposed to UV | 113.3 |
| Naph/Tol @ 1% strain | |
| No UV | 18.0 |
| Exposed to UV | 55.6 |
| Molecular Weight (Mw) | |
| No UV | 30100 |
| Exposed to UV | 38500 |
| Change | 8400 |

Examples 5-12

The following examples were prepared in an LX5 reactor or an LX3 reactor. The LX5 reactor has a volume of 25 to 30 grams and is capable of reaction temperatures up to 300° C. and vacuum levels of up to 0.1 millibar (mbar). The LX3 reactor has a volume of 600-1000 grams and is capable of reaction temperatures up to 300° C. and vacuum levels of up to 0.1 mbar.

Samples were exposed to filtered UV light provided by a Loctite Zeta 7411-S system, which used a 400 Watt (W) metal halide arc lamp and behaved like a D-bulb electrodeless bulb in spectral output with a 280-nm cut-on wavelength filter. The samples were exposed for an amount of time in seconds (sec) on both sides of an article to UV lights for the equivalent UVA dosage of 36 Joules per centimeter squared (J/cm$^2$) per side. The UV energy for the Loctite system is provided below in Table A, and was measured using an EIT PowerPuck. The dose was measured as the energy from 320 to 390 nm (UVA), 280 to 320 nm (UVB), 250 to 260 nm (UVC) and 395 to 445 nm (UVV). The dose was calculated in J/cm$^2$.

TABLE A

| | Loctite (filtered light). | | | |
|---|---|---|---|---|
| Loctite Dose | UVA J/cm$^2$ | UVB J/cm$^2$ | UVC J/cm$^2$ | UVV J/cm$^2$ |
| 320 sec exposure | 12.0 | 2.4 | 0 | 7.3 |
| 960 sec exposure | 36.0 | 7.2 | 0 | 21.9 |

Example 5

A copolymer was made by reacting 90 mole % bisphenol-A (BPA) and 10 mole % 4,4'-dihydroxybenzophenone (DHBP) with diphenylcarbonate (DPC) in an LX5 reactor. 25 grams of DPC was placed in a special reactor glass tube with a nipple at the bottom of the tube. BPA (22.202 grams) and DHBP (2.312 grams) were added. The glass tube was fitted to the reactor along with a Teflon seal. Vacuum was applied slowly and a leak check was carried out. An aqueous solution of NaOH (5 ppm versus total bisphenols) and tetramethyl ammonium hydroxide (TMAH) (250 ppm versus total bisphenols) was added as catalyst. Vacuum was applied slowly to the tube and subsequently released by introducing nitrogen into the glass tube. Heating jackets were wrapped around the glass tube and the tube was insulated by glass wool covering. The condenser temperature was maintained at 145° C. to remove phenol generated during the process. The reaction was carried out in four stages as follows (temp/pressure/time): 180° C./915 mbar/15 min, 230° C./170 mbar/60 min, 270° C./20 mbar/30 min, and 300° C./0.1 mbar/60 min. Phenol was released as a byproduct and continuously collected in a receiver trap. At the end of the reaction, the reactor pressure was brought back to atmospheric pressure and the glass nipple of the reactor tube was broken to retrieve the polymer in the form of a strand.

Example 6

A copolymer was made by reacting 80 mole % BPA and 20 mole % DHBP with DPC in an LX5 reactor. The process conditions were as described in Example 5, except that 19.735 grams of BPA and 4.625 grams of DHBP were used.

Example 7

A copolymer was made by reacting 90 mole % BPA and 10 mole % DHBP with bismethyl salicyl carbonate (BMSC) in an LX5 reactor. The procedure was as described in Example 5, with the following changes. 30 grams of BMSC, 18.223 grams of BPA, and 1.898 grams of DHBP were used. An aqueous solution of NaOH (5 ppm versus total bisphenols) and tetramethyl ammonium hydroxide (TMAH) (150 ppm versus total bisphenols) was added as catalyst. The condenser temperature was maintained at 125° C. to remove methyl salicylate generated during the process. The reaction was carried out in four stages as follows (temp/pressure/time): 180° C./915 mbar/10 min, 220° C./915 mbar/15 min, 230° C./100 mbar/15 min, and 300° C./0.1 mbar/10 min.

Example 8

A copolymer was made by reacting 90 mole % BPA and 10 mole % DHBP with DPC in an LX3 reactor. 850 grams of DPC, 754.88 grams of BPA, and 78.704 grams of DHBP were added to the reactor. An aqueous solution of NaOH (3.5 ppm versus total bisphenols) and tetramethyl ammonium hydroxide (TMAH) (250 ppm versus total bisphenols) was added as catalyst. Vacuum was applied slowly to the tube and subsequently released by introducing nitrogen into the glass tube. The condenser temperature was maintained at 145° C. to remove phenol generated during the process. The reaction was carried out in four stages as follows (temp/pressure/time): 130 to 180° C./885 mbar/90 min, 230° C./170 mbar/60 min, 270° C./20 mbar/30 min, and 300° C./0.1 mbar/30 min. Phenol was continuously collected in a receiver trap. At the end of the reaction, the reactor pressure was brought back to atmospheric pressure and the drain nut of the reactor tube was opened to retrieve the polymer in the form of a viscous liquid.

Example 9

A copolymer was made by reacting 90 mole % BPA and 10 mole % DHBP with DPC in an LX3 reactor as in Example 8, but with lower reactant masses and the following changes. 600 grams of DPC, 581.3 grams of BPA, and 60.544 grams of DHBP were added to the reactor. The reaction was carried out in seven stages as follows (temp/pressure/time): 130 to 180° C./885 mbar/200 min, 230° C./885 mbar/15 min, 230° C./500 mbar/45 min, 230° C./500-170 mbar/15 min, 250° C./170 mbar/60 min, 270° C./20 mbar/45 min, and 300° C./0.1 mbar/35 min.

Example 10

A copolymer was made by reacting 90 mole % BPA and 10 mole % DHBP with BMSC in an LX3 reactor. The procedure was as described in Example 8, with the following changes. 800 grams of BMSC, 485.939 grams of BPA, and 50.6134 grams of DHBP were used. An aqueous solution of NaOH (5 ppm versus total bisphenols) and tetramethyl ammonium hydroxide (TMAH) (150 ppm versus total bisphenols) was added as catalyst. The condenser temperature was maintained at 125° C. to remove methyl salicylate generated during the process. The reaction was carried out in five stages as follows (temp/pressure/time): 180° C./885 mbar/30 min, 220° C./885 mbar/30 min, 250° C./500 mbar/30 min, 250° C./100 mbar/30 min, and 300° C./0.1 mbar/5 to 10 min.

Example 11

A bisphenol-A homopolymer was made with DPC in an LX3 reactor. The procedure was as described in Example 8, with the following change. 700 grams of DPC and 690.72 grams of BPA were used.

Example 12

A bisphenol-A homopolymer was made with BMSC in an LX3 reactor. The procedure was as described in Example 10, with the following changes. 1000 grams of BMSC and 672.92 grams of BPA were used. The reaction was carried out in four stages as follows (temp/pressure/time): 180° C./885 mbar/30 min, 220° C./915 mbar/30 min, 230° C./100 mbar/30 min, and 300° C./0.1 mbar/5 to 10 min.

Results

Table 7 summarizes the Examples, where the composition is in mol % and the Mw is in Daltons. Examples 8 and 9 are not included because they resulted in low-molecular-weight material.

TABLE 7

| Example | Scale | Composition | Carbonyl Source | Mw |
| --- | --- | --- | --- | --- |
| 5 | Small | 10% DHBP | DPC | 18830 |
| 6 | Small | 20% DHBP | DPC | 18530 |
| 7 | Small | 10% DHBP | BMSC | 23430 |
| 10 | Large | 10% DHBP | BMSC | 23610 |
| 11 | Large | 100% BPA | DPC | 26480 |
| 12 | Large | 100% BPA | BMSC | 31870 |

Next, samples were evaluated for crosslinking. Chopped strands from each Example were pressed into films at 260° C. having a thickness of 2.54 mm. The films were then irradiated on both sides using the Loctite UV system to give a total of 36 J/cm² exposure on each side. A one-inch by two-inch section was cut from each film and placed in a bottle of dichloromethane and shaken for two hours. The undissolved, gel portion was removed and allowed to dry. The thickness of the insoluble, gel portion was measured in micrometers (μm) using optical microscopy. The presence of a gel indicated that crosslinking occurred. No crosslinking was observed for Examples 11 and 12, which served as controls.

Samples of unexposed polymer and exposed film were analyzed to determine the effect of UV exposure on the Mw of the soluble portion of the polymer. The Mw of Example 12 (control) remained the same, indicating no crosslinking occurred. Table 8 summarizes the results.

TABLE 8

| | Example | | | | |
| --- | --- | --- | --- | --- | --- |
| | 5 | 6 | 7 | 10 | 12 |
| Composition | 10% DHBP | 20% DHBP | 10% DHBP | 10% DHBP | 100% BPA |
| Carbonyl Source | DPC | DPC | BMSC | BMSC | BMSC |
| Mw before UV | 12294 | 14946 | 23030 | 27583 | 27702 |
| Mw after UV | 17067 | 20939 | | | 27814 |
| Delta Mw | 4773 | 5993 | | | 112 |
| Gel thickness (μm) | 4.79 | 6.31 | 10.6 | 17.6 | 0 |

To summarize, the DHBP-containing copolymers prepared by melt polymerization had a much higher molecular weight when prepared using BMSC compared to DPC, and cross-linked successfully when irradiated with UV light.

Set forth below are some embodiments of the methods and articles disclosed herein.

Embodiment 1

A process for making a cross-linkable polycarbonate resin, comprising: combining a first dihydroxy chain extender, a diaryl carbonate, and a transesterification catalyst to form a polycarbonate reaction mixture; melt polymerizing the polycarbonate reaction mixture with a hydroxybenzophenone to form the cross-linkable polycarbonate resin; and isolating the cross-linkable polycarbonate resin.

Embodiment 2

The process of Embodiment 1, wherein the hydroxybenzophenone is added to the polycarbonate reaction mixture prior to melt polymerization, such that the process is a batch process, or is added continuously to the polycarbonate reaction mixture during the melt polymerization process.

Embodiment 3

The process of any of the preceding Embodiments, further comprising adding a quenching agent to the polycarbonate reaction mixture prior to isolating the cross-linkable polycarbonate resin.

Embodiment 4

The process of Embodiment 4, wherein the quenching agent is a Bronsted acid.

Embodiment 5

The process of any of Embodiment 3 or 4, wherein the quenching agent is added at a pressure of greater than or equal to 2 bars and is mixed with the cross-linkable polycarbonate resin for a period of time of greater than or equal to 5 seconds prior to the addition of any additives having a reactive OH group or reactive ester group to the cross-linkable polycarbonate resin.

Embodiment 6

The process of any of the preceding Embodiments, wherein the hydroxybenzophenone is a dihydroxybenzophenone.

Embodiment 7

The process of Embodiment 6, wherein the cross-linkable polycarbonate resin contains from about 50 mole % to about 99.5 mole % of repeating units derived from the first dihydroxy chain extender, and contains from about 0.5 mole % to about 50 mole % of repeating units derived from the dihydroxybenzophenone.

Embodiment 8

The process of any of Embodiments 1-5, wherein the hydroxybenzophenone is a monohydroxybenzophenone.

Embodiment 9

The process of Embodiment 8, wherein the cross-linkable polycarbonate resin contains from about 0.5 mole % to about 5 mole % of endcap groups derived from the monohydroxybenzophenone.

Embodiment 10

The process of any of Embodiments 1-5, wherein the hydroxybenzophenone is the bis-carbonate of 4-hydroxybenzophenone, and is used as the diaryl carbonate.

Embodiment 11

The process of any of the preceding Embodiments, wherein the transesterification catalyst comprises an alkali catalyst and a quaternary catalyst; wherein the alkali catalyst is an alkali and/or alkaline earth metal hydroxide, an alkali and/or alkaline earth metal salt of a carboxylic acid, or an alkali and/or alkaline earth metal salt of a non-volatile inorganic acid; and wherein the quaternary catalyst is a quaternary ammonium compound or a quaternary phosphonium compound.

Embodiment 12

The process of any of Embodiments 1-10, wherein the transesterification catalyst is a quaternary catalyst and does not contain an alkali catalyst; wherein the quaternary catalyst is a quaternary phosphonium compound.

Embodiment 13

The process of any of the preceding Embodiments, wherein the melt polymerization occurs at an elevated temperature of 120° C. to 350° C.

Embodiment 14

The process of any of the preceding Embodiments, wherein the melt polymerization occurs at a pressure of about 0.1 millibar to about 920 millibar.

Embodiment 15

The process of any of the preceding Embodiments, further comprising: forming an article from a polymeric composition comprising the melt-formed cross-linkable polycarbonate resin; and exposing the article to an effective dosage of ultraviolet radiation to cause crosslinking of the cross-linkable polycarbonate resin.

Embodiment 16

The process of Embodiment 15, wherein the effective dosage is from about 1 J/cm$^2$ to about 60 J/cm$^2$ of UVA radiation.

Embodiment 17

The process of Embodiment 15 or 16, wherein the ultraviolet radiation has a wavelength between 280 nm and 380 nm.

Embodiment 18

The process of any of Embodiments 15-17, wherein the polymeric composition comprises a second polymer that does not comprise units derived from the hydroxybenzophenone.

Embodiment 19

The process of Embodiment 18, wherein the second polymer comprises a polyester, a homopolycarbonate, a polycarbonate copolymer, a polyester, a polyesteramide, a polyimide, a polyetherimide, a polyamideimide, a polyether, a polyethersulfone, a polyepoxide, a polylactide, a polylactic acid, or a combination comprising one or more of the foregoing.

Embodiment 20

An article formed from the process of any of Embodiments 15-19.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A process for making a cross-linkable polycarbonate resin, comprising:
combining a first dihydroxy chain extender, a diaryl carbonate, and a transesterification catalyst to form a polycarbonate reaction mixture;
melt polymerizing the polycarbonate reaction mixture with a hydroxybenzophenone to form the cross-linkable polycarbonate resin; and
isolating the cross-linkable polycarbonate resin,
wherein the hydroxbenzophenone is a monohydroxybenzophenone.

2. The process of claim 1, wherein the hydroxybenzophenone is added to the polycarbonate mixture prior to melt polymerization, such that the process is a batch process, or is added continuously to the polycarbonate reaction mixture during the melt polymerization process.

3. The process of claim 1, further comprising adding a quenching agent to the polycarbonate reaction mixture prior to isolating the cross-linkable polycarbonate resin.

4. The process of claim 3, wherein the quenching agent is a Bronsted acid.

5. A process for making a cross-linkable polycarbonate resin, comprising:
combining a first dihydroxy chain extender, a diaryl carbonate, and a transesterification catalyst to form a polycarbonate reaction mixture;
melt polymerizing the polycarbonate reaction mixture with a hydroxybenzophenone to form the cross-linkable polycarbonate resin;
isolating the cross-linkable polycarbonate resin; and
adding a quenching agent to the polycarbonate reaction mixture prior to isolating the cross-linkable polycarbonate resin,
wherein the quenching agent is added at a pressure of greater than or equal to 2 bars and is mixed with the cross-linkable polycarbonate resin for a period of time of greater than or equal to 5 seconds prior to the addition of any additives having a reactive OH group or reactive ester group to the cross-linkable polycarbonate resin.

6. The process of claim 5, wherein the hydroxybenzophenone is a dihydroxybenzophenone.

7. A process for making a cross-linkable polycarbonate resin, comprising:
combining a first dihydroxy chain extender, a diaryl carbonate, and a transesterification catalyst to form a polycarbonate reaction mixture;
melt polymerizing the polycarbonate reaction mixture with a hydroxybenzophenone to form the cross-linkable polycarbonate resin; and
isolating the cross-linkable polycarbonate resin;
wherein the hydroxybenzophenone is a dihydroxybenzophenone, and wherein the cross-linkable polycarbonate resin contains from about 50 mole % to about 99.5% of repeating units derived from the first dihydroxy chain extender, and contains from about 0.5 mole % to about 50 mole % of repeating units derived from the dihydroxybenzophenone.

8. The process of claim 5, wherein the hydroxbenzophenone is a monohydroxybenzophenone.

9. The process of claim 1, wherein the cross-linkable polycarbonate resin contains from about 0.5 mole % to about 5 mole % of endcap groups derived from the monohydroxybenzophenone.

10. A process for making a cross-linkable polycarbonate resin, comprising:
combining a first dihydroxy chain extender, a diaryl carbonate, and a transesterification catalyst to form a polycarbonate reaction mixture;
melt polymerizing the polycarbonate reaction mixture with a hydroxybenzophenone to form the cross-linkable polycarbonate resin; and
isolating the cross-linkable polycarbonate resin;
wherein the hydroxybenzophenone is the bis-carbonate of 4-hydroxybenzophenone, and is used as the diaryl carbonate.

11. The process of claim 1, wherein the transesterification catalyst comprises an alkali catalyst and a quaternary catalyst;
wherein the alkali catalyst is an alkali and/or alkaline earth metal hydroxide, an alkali and/or alkaline earth metal salt of a carboxylic acid, or an alkali and/or alkaline earth metal salt of a non-volatile inorganic acid; and
wherein the quaternary catalyst is a quaternary ammonium compound or a quaternary phosphonium compound.

12. The process of claim 7, wherein the transesterification catalyst is a quaternary catalyst and does not contain an alkali catalyst; wherein the quaternary catalyst is a quaternary phosphonium compound.

13. The process of claim 11, wherein the melt polymerization occurs at an elevated temperature of 120° C. to 350° C.

14. The process of claim 11, wherein the melt polymerization occurs at a pressure of about 0.1 millibar to about 920 millibar.

15. A process comprising:
combining a first dihydroxy chain extender, a diaryl carbonate, and a transesterification catalyst to form a polycarbonate reaction mixture;
melt polymerizing the polycarbonate reaction mixture with a hydroxybenzophenone to form the cross-linkable polycarbonate resin; and
isolating the cross-linkable polycarbonate resin;
wherein the process further comprises
forming an article from a polymeric composition comprising the melt-formed cross-linkable polycarbonate resin; and
exposing the article to an effective dosage of ultraviolet radiation to cause crosslinking of the cross-linkable polycarbonate resin.

16. The process of claim 15, wherein the effective dosage is form about 1 J/cm$^2$ to about 60 J/cm$^2$ of UVA radiation.

17. The process of claim 15, wherein the ultraviolet radiation has a wavelength between 280 nm and 380 nm.

18. The process of claim 15, wherein the polymeric composition comprises a second polymer that does not comprise units derived from the hydroxybenzophenone.

19. The process of claim 18, wherein the second polymer comprises a polyester, a homopolycarbonate, a polycarbonate copolymer, a polyester, a polyesteramide, a polyimide, a polyetherimide, a polyamideimide, a polyether, a polyethersulfone, a polyepoxide, a polyactide, a polylactic acid, or a combination comprising one or more of the foregoing.

20. An article formed from the process of claim 15.

21. The process of claim 7, wherein the polycarbonate resin contains from about 50 mole % to about 99.5% of repeating units derived from bisphenol A.

22. The process of claim 1, wherein the diaryl carbonate is bis(methyl salicyl) carbonate.

23. The process of claim 7, wherein the diaryl carbonate is bis(methyl salicyl) carbonate.

24. The process of claim 15, wherein the diaryl carbonate is bis(methyl salicyl) carbonate.

* * * * *